May 19, 1953
G. D. FLAITH ET AL
2,638,914
TAP AND COUPLING FOR BARRELS
Filed June 23, 1948
9 Sheets-Sheet 1
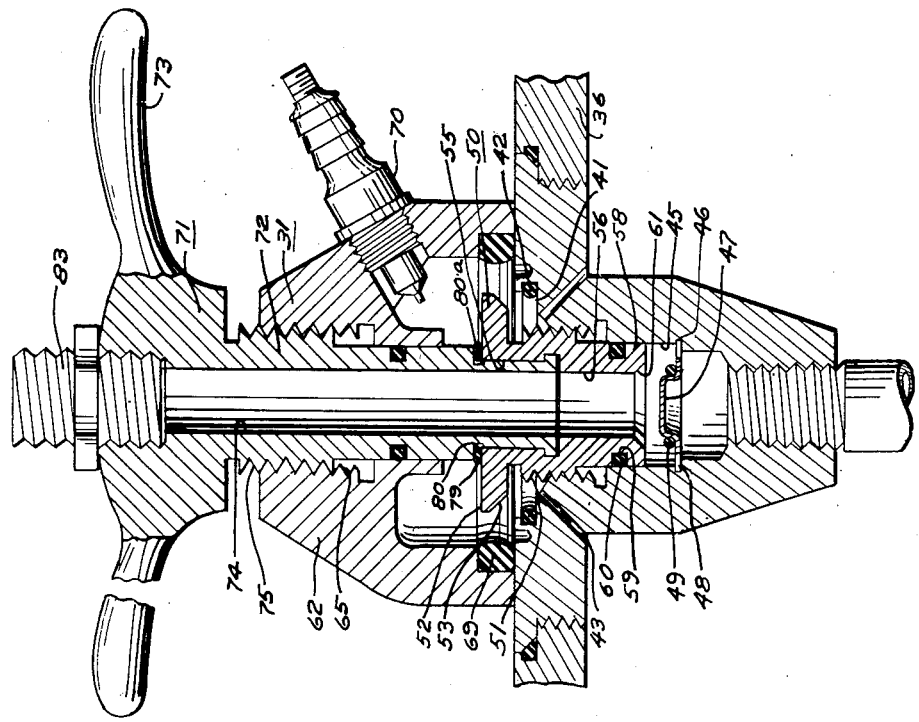
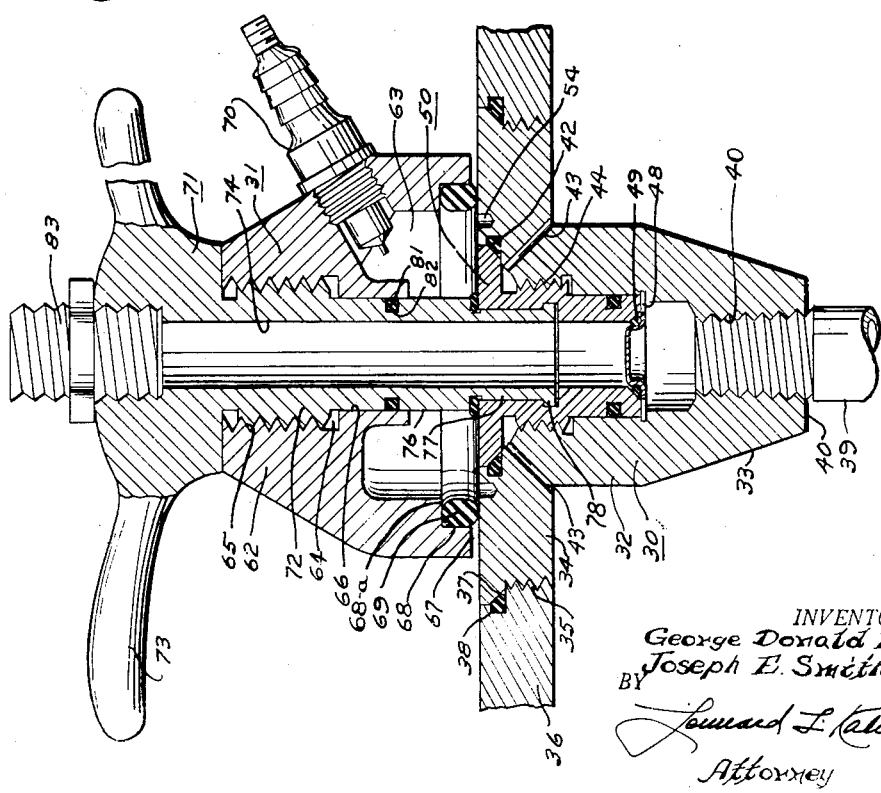
INVENTORS
George Donald Flaith
Joseph E. Smith, Jr.
BY
Leonard L. Kalish
Attorney

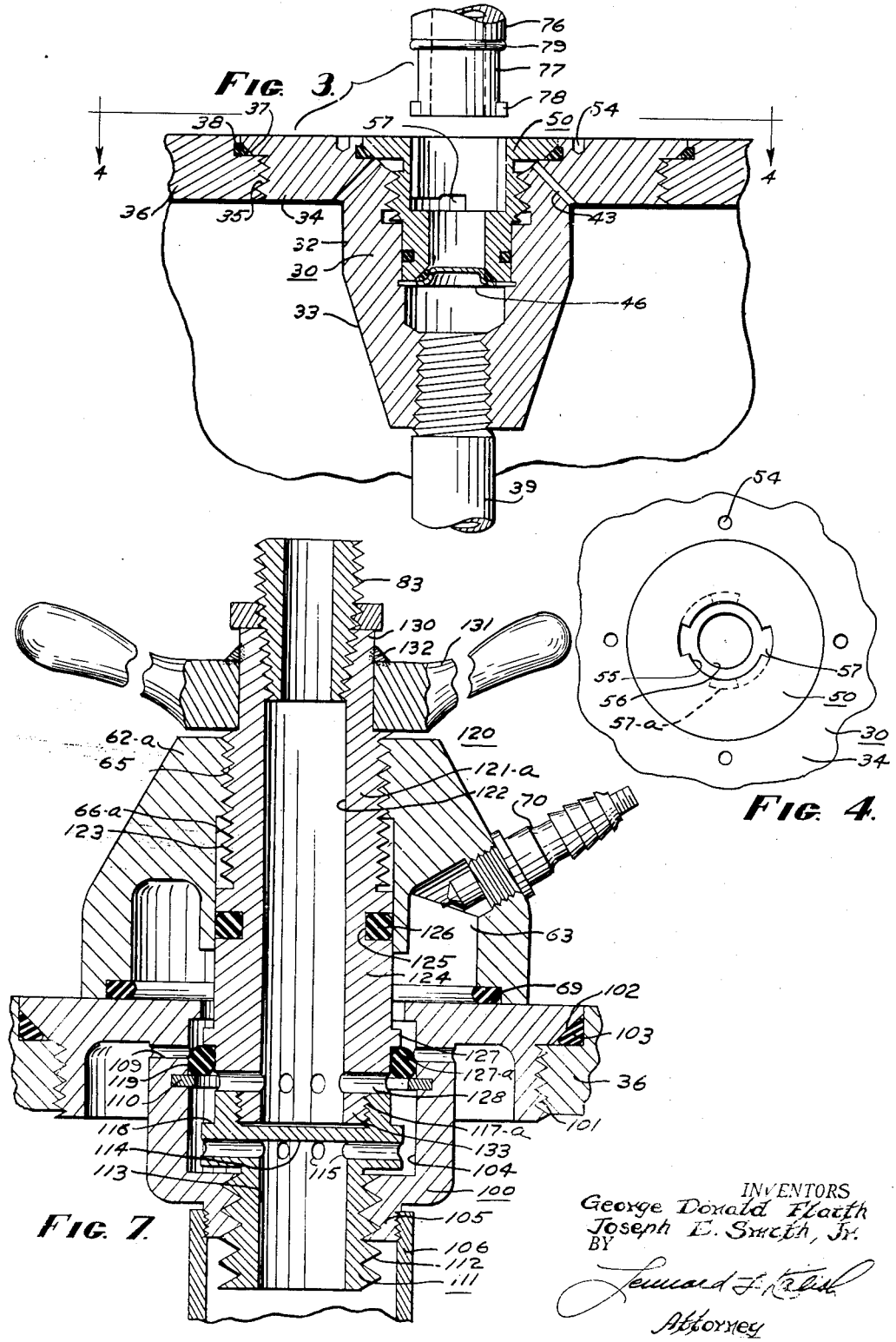

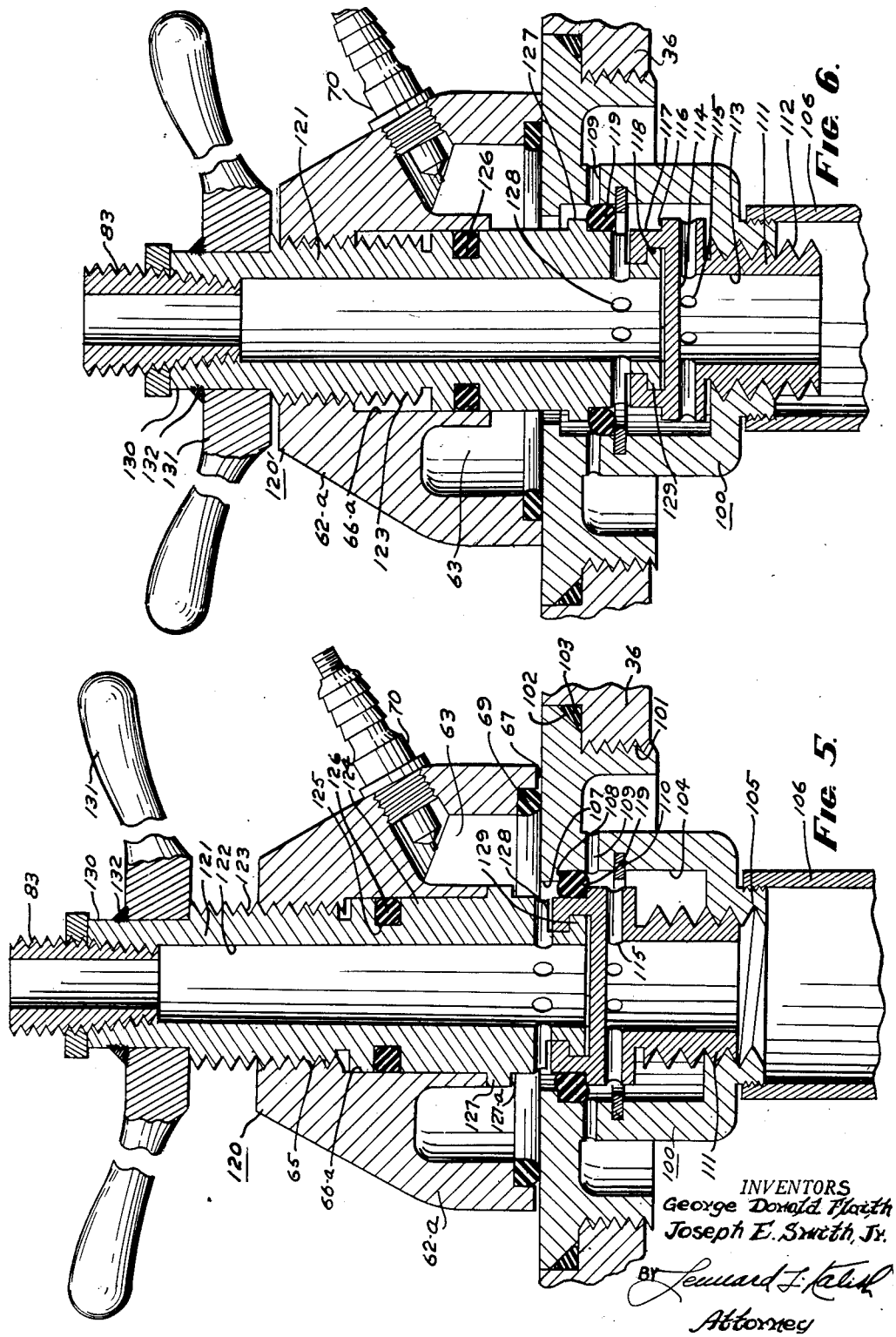

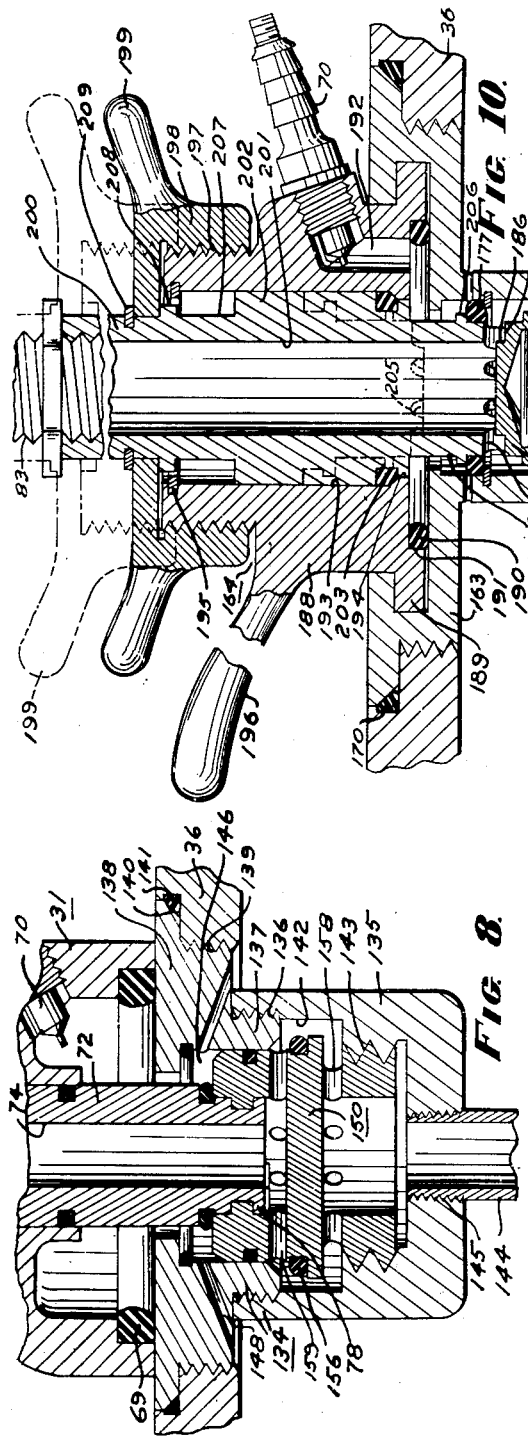
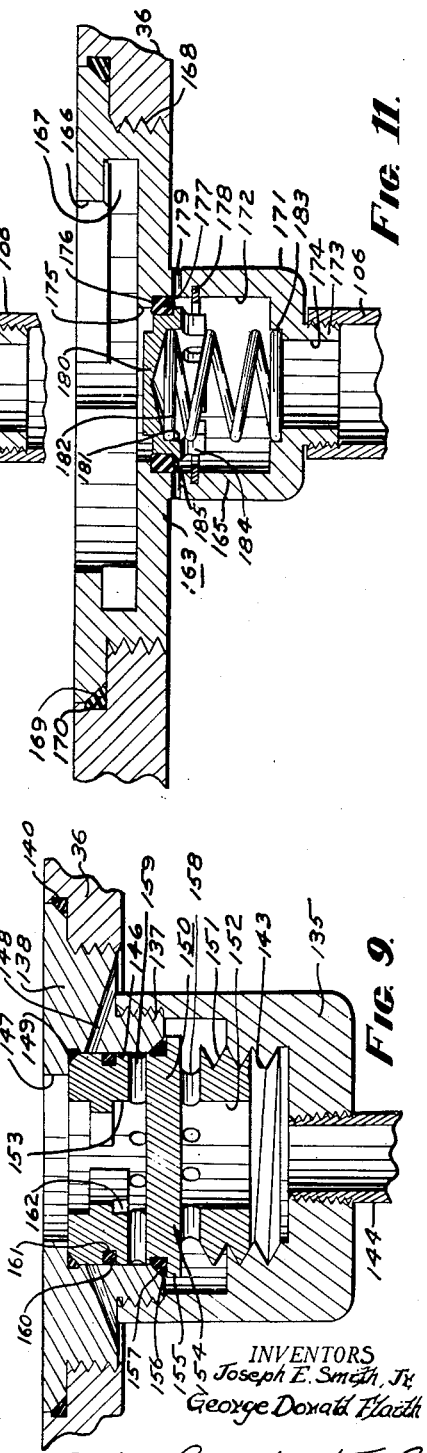

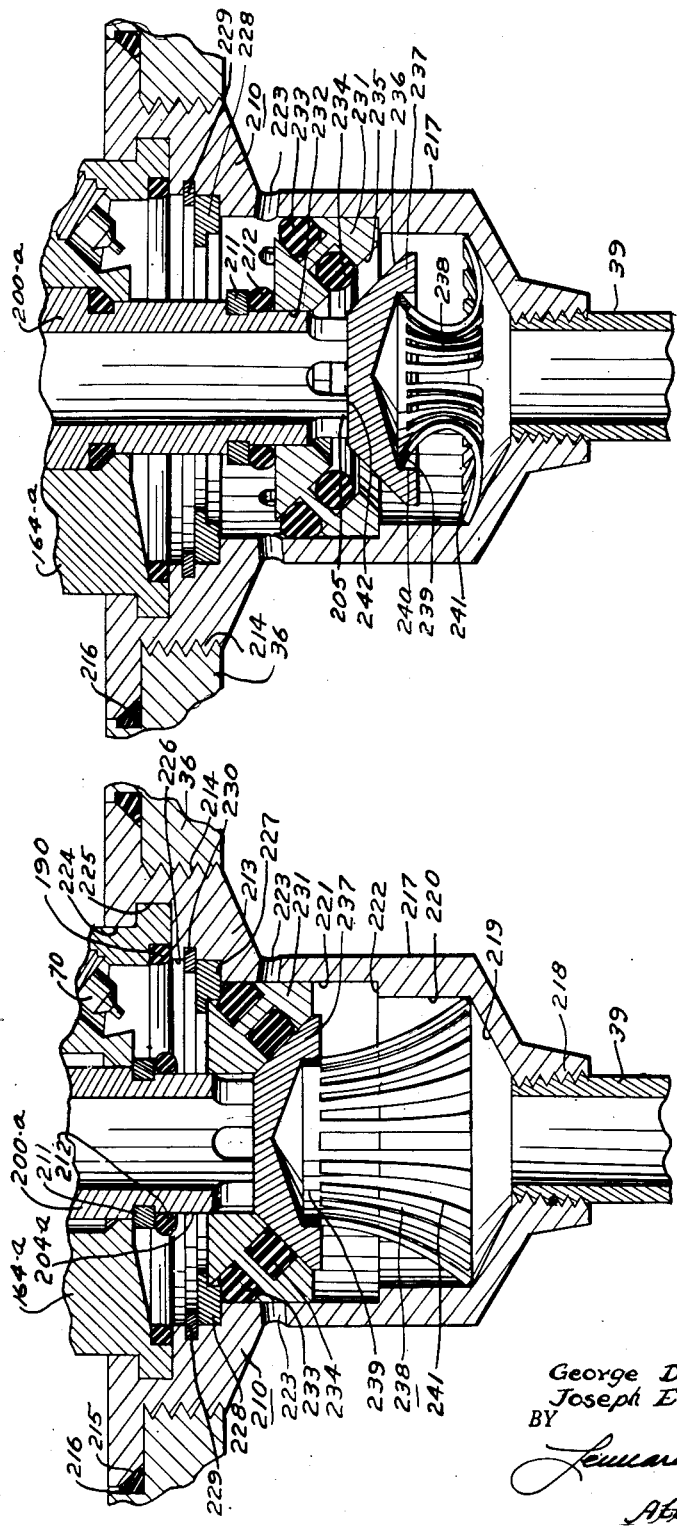

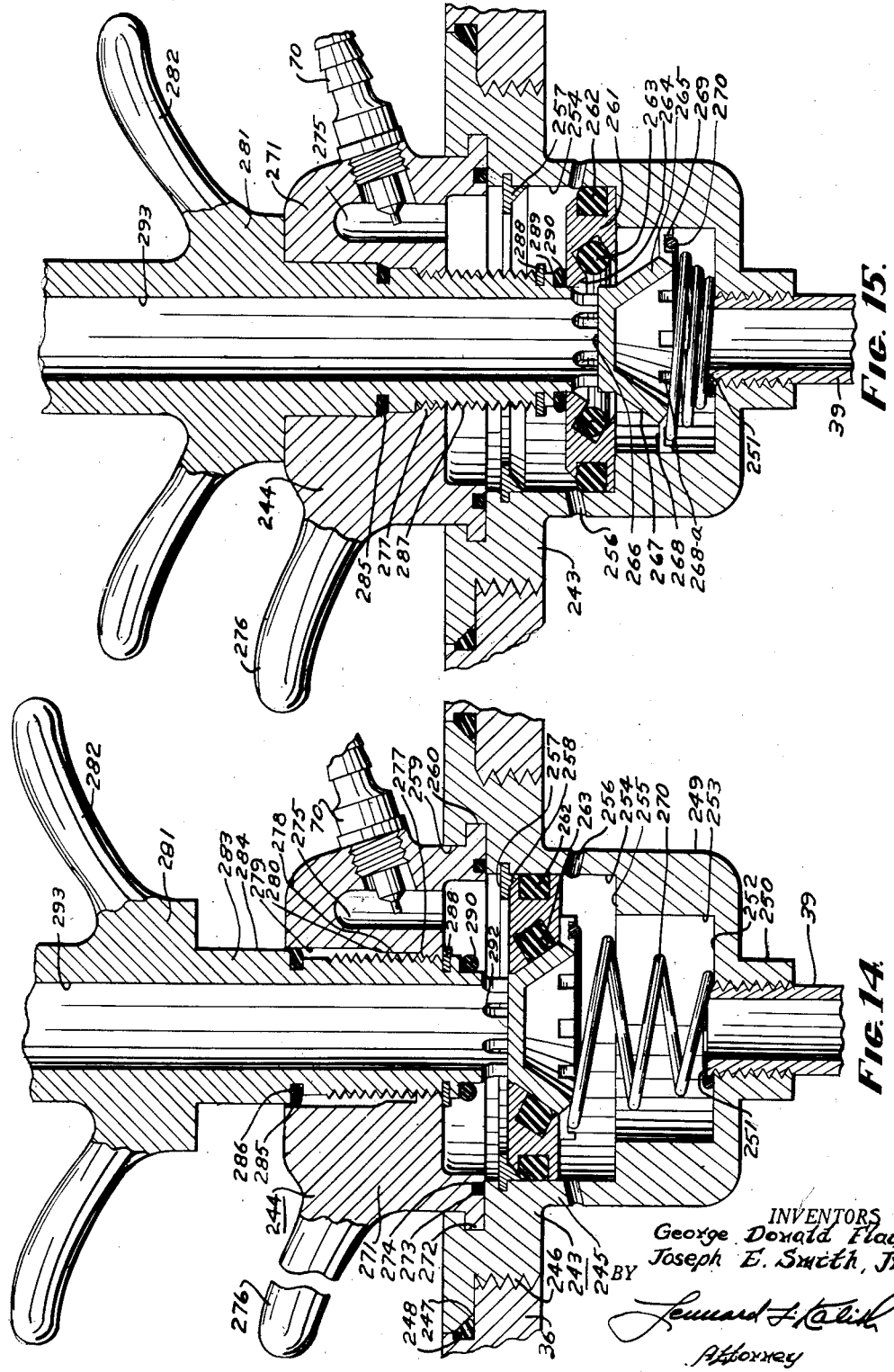

May 19, 1953  G. D. FLAITH ET AL  2,638,914
TAP AND COUPLING FOR BARRELS
Filed June 23, 1948  9 Sheets-Sheet 7
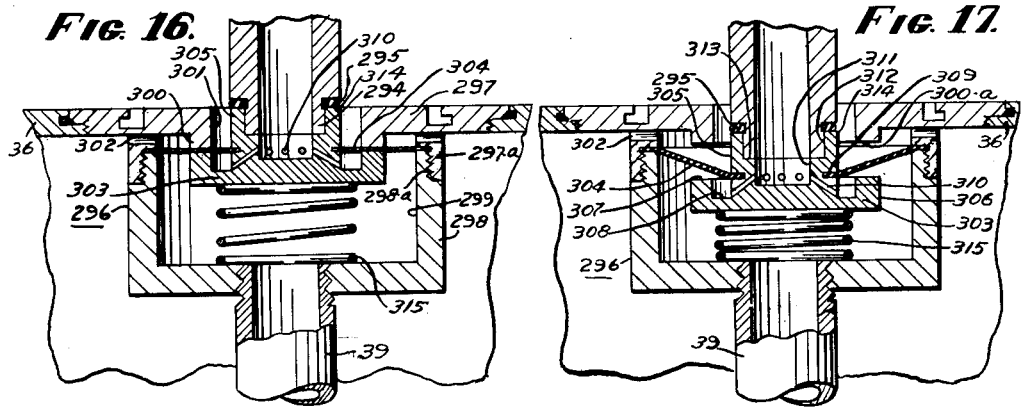
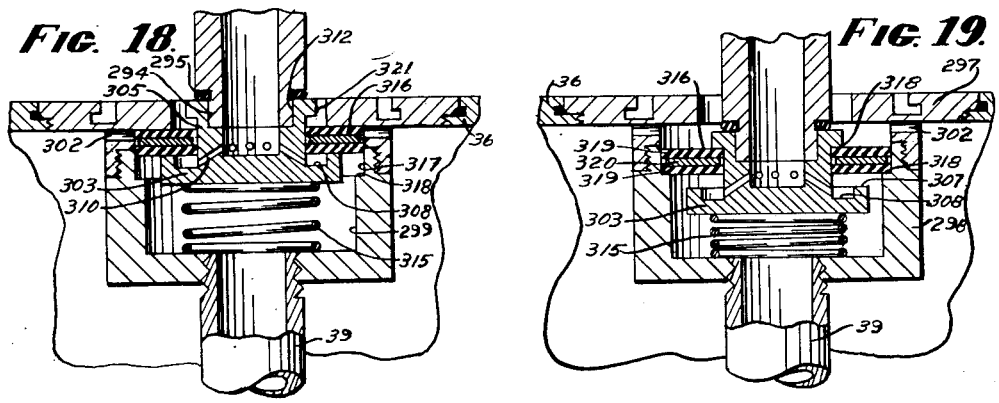
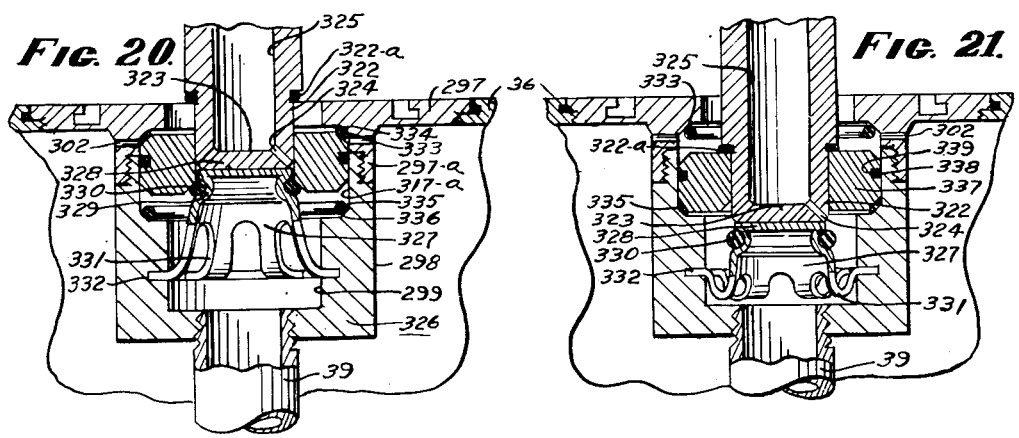
INVENTORS
George Donald Flaith
Joseph E. Smith, Jr.
BY Leonard F. Kalish
Attorney

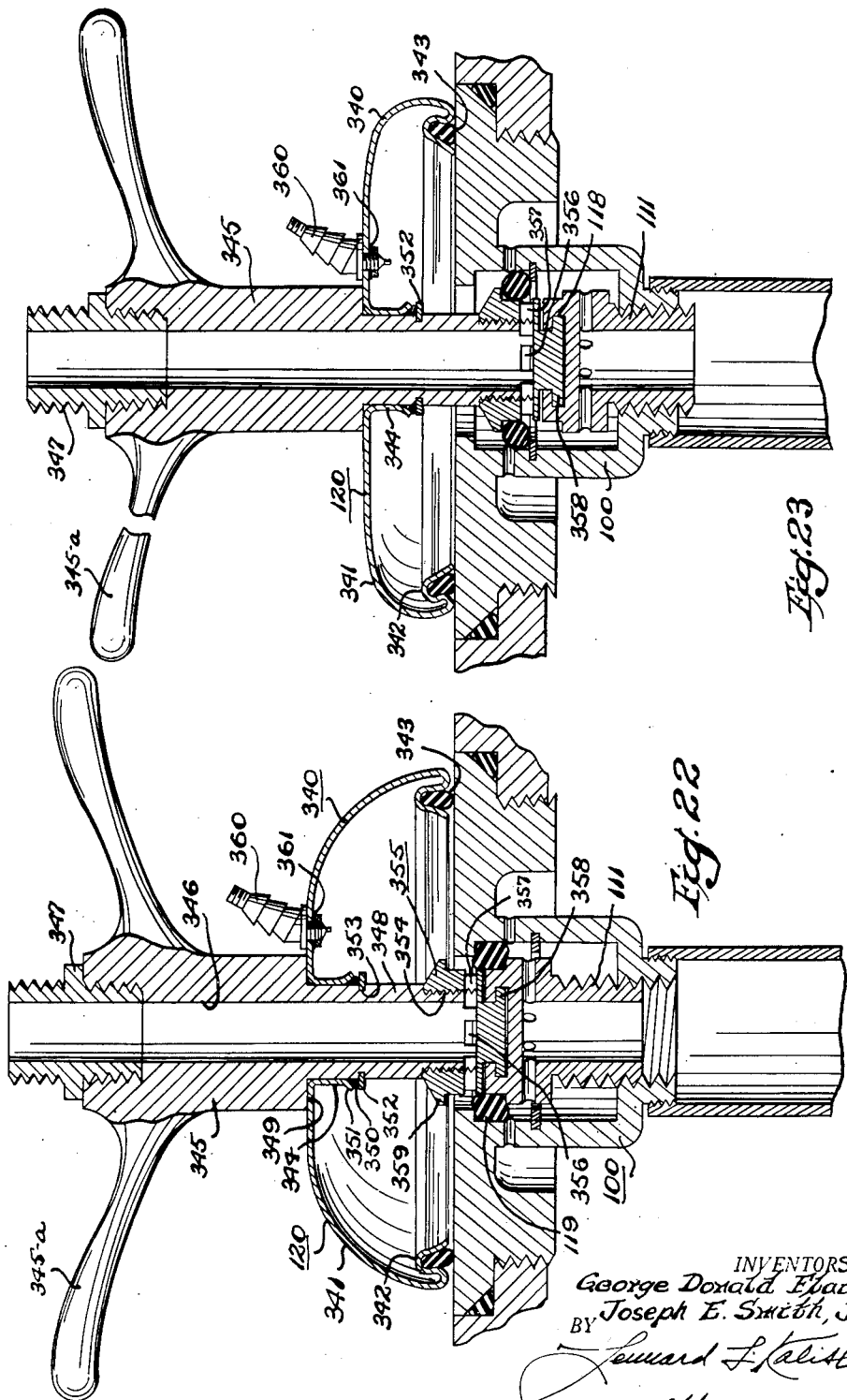

May 19, 1953  G. D. FLAITH ET AL  2,638,914
TAP AND COUPLING FOR BARRELS
Filed June 23, 1948  9 Sheets-Sheet 9
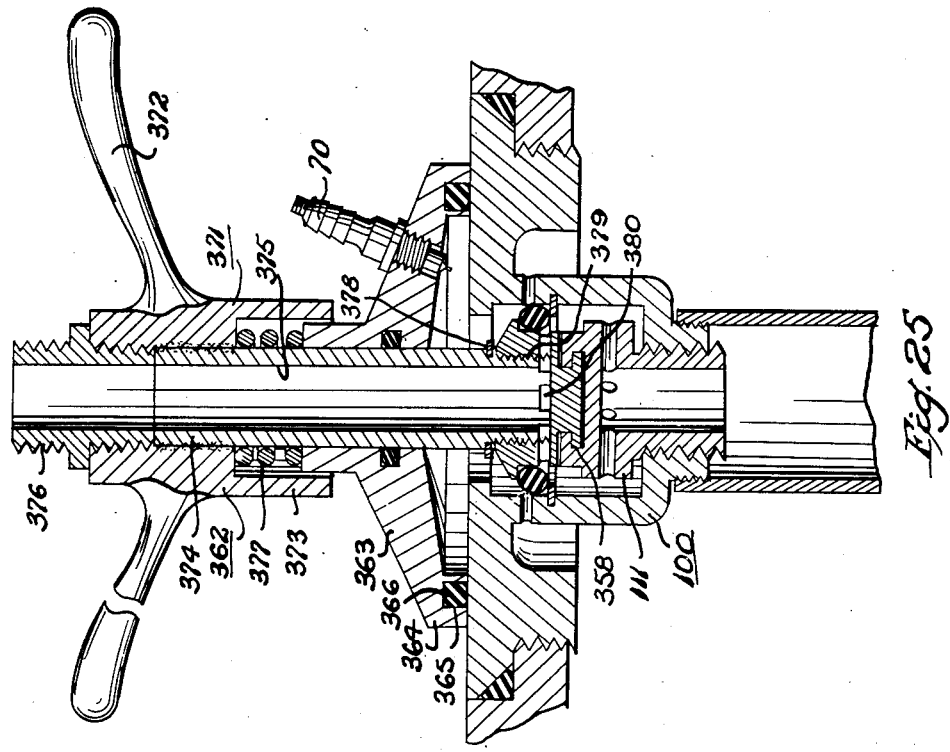
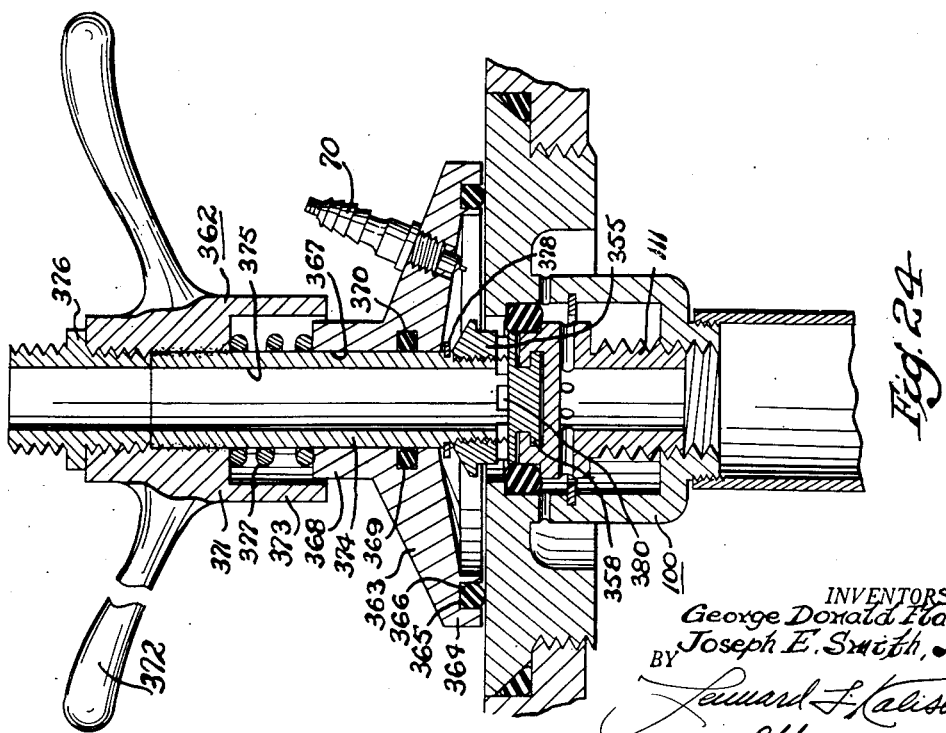
INVENTORS
George Donald Flaith
Joseph E. Smith, Jr.
BY
Leonard L. Kalish
Attorney Patented May 19, 1953

2,638,914

UNITED STATES PATENT OFFICE 2,638,914

TAP AND COUPLING FOR BARRELS

George Donald Flaith and Joseph E. Smith, Jr., Philadelphia, Pa.

Application June 23, 1948, Serial No. 34,728

15 Claims. (Cl. 137—212)

The present invention relates to closure-and-tapping mechanisms or devices for barrels, drums and other containers for withdrawing the liquid-contents thereof (beer, for instance) while simultaneously passing a gas under pressure (compressed air or $CO_2$) into the barrel for expelling the liquid therefrom and for keeping the liquid under pressure.

The closure-and-tapping device of the present invention comprises two main components or parts, namely, the closure mechanism which, in its entirety, we hereinafter call the "bung" (for brevity), and the tapping mechanism which may also be designated as the bung-operator or as the bung-operating connector—the bung and the bung-operator being each so related and constructed that they are mutually interdependent—neither being able to perform all its functions (for which it is intended and constructed) without the cooperation of and mechanical interaction with the other.

An object of the present invention is to provide new and improved closure-and-tapping mechanism for barrels, drums and other containers.

Another object of the present invention is to provide novel closure-and-tapping mechanism for barrels and the like which is simple and inexpensive to manufacture and which is sturdy and dependable in operation. Other objects and advantages of the present invention are apparent in the following detailed description, appended claims and accompanying drawings.

Generally speaking, the present invention contemplates novel closure-and-tapping mechanism for barrels and the like including a quick-attachable and -detachable bung-operator or bung-operator connector having a beer (or other liquid) outlet connection and having a compressed air (or other gas) inlet connection and including a bung comprising an apertured bung-body constructed and arranged to be affixed (either permanently or removably) within the bung-hole of the barrel or the like, and an apertured valving-member mounted within said valve-chamber and constructed and arranged to be moved axially to and fro relative thereto. The valve-chamber is provided with a pair of axially-spaced annular valve-seats while the valving-member is provided with valve-sealing means constructed and arranged to be brought into and out of contact with the valve-seats upon movement of the valving-member. The valve-chamber is provided with an air-inlet passageway near its upper end and a beer outlet passageway communicating with the apertured valving-member—movement of the valving-member in one axial direction serving to close off both the air-inlet passageway and the beer outlet passageway, while movement of the valving-member in the opposite direction serves to open said passageways while keeping them separated from each other. The air-inlet passageway extends outside or peripherally of the valving-member while the beer outlet passageway communicates with and forms an extension of the apertured valving-member so that the incoming air passes from the bung-operating connector downward and outside of the valving-member while the outgoing beer passes upward centrally through the valving-member to the bung-operating connector.

According to a preferred embodiment, to be described more fully hereinbelow, the two valve-seats are opposed to each other with the apertured valving-member movable so as to bring the valve-sealing means alternately into contact with one or the other of said valve-seats, both the air-inlet passageway and the beer outlet passageway being open for connection with the bung-operator but being separated from each other when the valve-sealing means is compressed against one of the valve-seats. When the valve-sealing means is compressed against the other valve-seat, both the air-inlet passageway and the beer outlet passageway are closed off from the bung-operating connector and are brought into communication with each other.

The bung-operator or bung-operating connector includes an outer housing and an inner stem each forming a fluid-passageway in non-communicating relation to each other (axially movable in relation to each other), the outer member being in the nature of a gland and having a resilient sealing ring at its open end, adapted to be sealingly pressed against an outer surface of the bung housing (by said gland) thereby to form a seal between said gland and the outer open end or mouth of the valve-chamber in said bung, thus completing the fluid-passageway from said gland through the mouth of said valve-chamber (this fluid-passageway being completed by one or more openings extending through the side wall of said valve-chamber into the interior of the barrel at a point inwardly of the outermost valve-seat in said valve-chamber but outwardly of the innermost valve-seat in said valve-chamber).

The gland has a valved inlet adapted to receive a hose at its outer end, whereby communication is established between the hose and the interior of the gland and hence with the interior of the valve when the mechanism of said bung is set in its "open" position.

The stem is arranged so that its turning, in one direction, will cause the unseating of the valving-member in the bung, when the stem is turned in one direction, and will cause the seating of said valving-member when turned in the other direction (while the bung-operating connector or bung-operator is attached to the bung).

The bung-operator may be attached to the bung by rotary-interlocking connection between the stem and the valving-member or by a rotary-interlocking connection between the gland and the bung-body. The pressing of the gland-seal against the bung-body, into sealing relation between the two, may be accomplished by producing an axial movement of the gland in relation to the stem by screw threads therebetween operated by the relative movement of one in relation to the other after one or the other has been relatively interlocked with the bung body or with the valving-member (as the case may be) or by spring-urged or by spring-impelled axial movement between stem and gland by means of a helical (compression or tension) spring or by a spring-drum or a spring-dish gland, per se.

In several embodiments of the present invention a single sealing member or sealing ring is used for alternately seating against one of the two valve-seats, one above and one below the transverse fluid passageway extending from beneath the mouth of the valve-chamber through the side wall thereof into the interior of the valve, the sealing member being seated against the upper of said valve-seats nearest the mouth of the valve-chamber by a ring-engaging shoulder near the upper end of the valving-member, and being seated against the lower of said valve-seats by a ring-engaging shoulder near the lower end of the stem of the bung-operator, whereby said valving-member and sealing ring entirely close the mouth of the valve-chamber when the valving-member is in one position and whereby the sealing ring and the ring-engaging shoulder at the lower end of the stem serve to establish a fluid-tight seal between the hollow stem and the interior of the valve-chamber when the stem and valving-member are in operative relation to each other with the valving-member in unseated position.

For the purpose of illustrating the invention, there are shown in the accompanying drawings forms thereof which are at present preferred, although it is to be understood that the various instrumentalities of which the invention consists can be variously arranged and organized and that the invention is not limited to the precise arrangements and organizations of the instrumentalities as herein shown and described.

Referring to the accompanying drawings in which like reference characters indicate like parts throughout:

Figure 1 represents a vertical cross-sectional view showing one embodiment of the present invention connected within the bung-opening of a barrel or the like, with the valve in closed position.

Figure 2 represents a vertical cross-sectional view generally like that of Figure 1 but showing the valve in open position.

Figure 3 represents a vertical cross-sectional view showing the embodiment of Figures 1 and 2 but with the bung-operating connector shown detached from the bung.

Figure 4 represents an elevational view looking generally in the direction of the arrows 4—4 of Figure 3.

Figure 5 represents a vertical cross-sectional view generally like that of Figure 1 but showing another embodiment of the present invention with the valve in closed position.

Figure 6 represents a vertical cross-sectional view of the embodiment of Figure 5 with the valve in open position.

Figure 7 represents a vertical cross-sectional view generally like that of Figure 6 but showing a somewhat modified form of construction.

Figure 8 represents a fragmentary vertical cross-sectional view generally like those of Figures 2 and 6 but showing still another embodiment of the present invention.

Figure 9 represents a vertical cross-sectional view showing the appearance of the bung of Figure 8 when its valve is in closed position and when the coupling member is detached.

Figure 10 represents a vertical cross-sectional view generally like those of Figures 2 and 6, of a further embodiment of the present invention.

Figure 11 represents a vertical cross-sectional view showing the appearance of the bung of Figure 10 with the valve in closed position and with the bung-operating connector detached.

Figure 12 represents a fragmentary vertical cross-sectional view of still another embodiment of the present invention with the valve shown in closed position.

Figure 13 represents a vertical cross-sectional view of the embodiment of Figure 12 with the valve shown in open position.

Figure 14 represents a vertical cross-sectional view of still another embodiment of the present invention with the valve shown in closed position.

Figure 15 represents a view generally like that of Fig. 14 but showing the valve in open position.

Figure 16 represents a fragmentary vertical cross-sectional view showing a modified form of valve construction.

Figure 17 represents a view like that of Figure 16 but with the valve shown in open position.

Figure 18 represents a view generally like that of Figure 16 but showing still another form of valve construction.

Figure 19 represents a view like that of Figure 18 but showing the valve in open position.

Figure 20 represents a fragmentary vertical cross-sectional view showing a modified form of the embodiment of Figure 12.

Figure 21 represents a view generally like that of Figure 20 but showing the valve in open position.

Figure 22 represents a cross-sectional view generally like that of Figure 5 but showing still another embodiment of the present invention, with the valve in closed position.

Figure 23 shows the embodiment of Figure 22 in open position.

Figure 24 represents a vertical cross-sectional view like that of Figure 22 but showing still a further modification of the present invention.

Figure 25 represents a view of the embodiment of Figure 24 in open position.

Referring first to the embodiment of Figures 1–4, the novel closure-and-tapping mechanism of the present invention may include a bung indicated generally by the reference character 30 and a bung-operating connector indicated generally by the reference character 31.

As indicated particularly in Figure 3, the bung 30 includes an integrally formed body 32 having an apertured downwardly protruding portion 33 and a generally disc-shaped flange 34 which is externally threaded as at 35 for detachable connection within the bung-opening of a barrel or drum 36.

An annular shoulder 37 is provided at the upper edge of the flange 34 so as to compress a gasket 38 mounted in the bung-opening, thereby to provide a fluid-tight seal.

A riser-pipe or leg 39 is threadedly connected to the stem 33 as at 40 and extends downwardly therefrom to adjacent the bottom of the barrel 36 in conventional manner (not shown).

The body 32 is provided with an annular valve-seat 41 (recessed slightly from its upper edge) in which is mounted a sealing-gasket 42. The sealing gasket 42 is preferably formed as a continuous ring of resilient material, of the type commonly known as an O ring, which is normally circular in cross-section, as indicated in Figure 2, but which is distorted under axial pressure so as to spread radially in the manner indicated in Figure 1, thereby to provide a fluid-tight peripheral seal in a manner well known in the art.

A plurality of air-openings 43 extends downward from below the valve-seat 41 to the underside of the flange 34.

The central aperture or chamber of the body 32 is threaded as at 44 for a short distance down from the valve-seat 41 and is provided with a smooth-bore cylindrical portion 45 extending downward from the threaded portion 44 and coaxial therewith.

A valve-seat 46 is provided adjacent the lower end of the cylindrical bore 45; the valve seat 46 being of the self-aligning type having a central upwardly-protruding button or head and having a plurality of peripheral notches which, as will be described hereinbelow, permit flow of beer or other fluid upward through the bung 30.

An O-ring 49 is fitted about the button 47 to provide an annular seal for the valve seat 46 in a manner to be described hereinbelow.

The bung 30 is provided with a plurality of circumferentially-spaced downwardly-extending openings or sockets 54 into which can be fitted the correspondingly placed prongs of a spanner wrench or other appropriate tool (not shown) to permit the bung 30 to be rotated for attachment to or detachment from the bung-opening.

An integrally formed rotatable valve-member 50 is mounted within the central aperture of the bushing-member 30; the valve-member being externally threaded as at 51 for engagement with the threaded portion 44 and having an uppermost generally cylindrical shoulder 52 which is beveled as at 53 so as to provide a valve which compresses the O-ring 42 when the valve-member 50 is screwed in as far as it will go, thereby to provide a fluid-tight seal with the valve-seat 41, in the manner shown in Figures 1 and 3, so as to close off the air-openings 43 and to provide an "on-off" air-valve as will be described hereinbelow.

The valve-member 50 is centrally apertured and is provided with a generally cylindrical upper bore 55 and a smaller-diameter co-axial lower bore 56.

As indicated particularly in Figures 3 and 4, the upper bore 55 is provided with bayonet-slots 57 whose function will be hereinafter described.

The lower end of the valve member 50 is formed as a cylindrical surface 58 which fits slidably within the cylindrical bore 45 of the body 32. The surface 58 is provided with an annular groove 59 which carries an O-ring 60 providing a fluid-tight seal between the surface 58 and the bore 45.

The lowermost end of the valve-member 50 is beveled as at 61 so as to provide a beer valve, which compresses the O-ring 49 when the valve-member 50 is in lowermost position as shown in Figures 1 and 3, thereby to close off the openings 48 in the valve seat 46, and which is raised to valve-opening position when the valve-member 50 is unscrewed to the position shown in Figure 2.

As indicated particularly in Figures 1 and 3, the button 47 extends within the beveled end 61 when the valve-member 50 is in lowermost position so that the valve seat 46 is automatically centered and aligned relative thereto.

The bung 30 is installed in the barrel 36 by the brewer (with the valve-member in the closed position shown in Figures 3 and 4) and can be removed from the bung-opening after the empty barrel is returned, in order to permit cleaning and refilling of the barrel 36.

The bung-operating connector 31 includes an integrally-formed pressure-gland or housing 62 which is generally cup-shaped with an open chamber 63 formed in its lower portion and with an axial opening 64 extending upwardly from said chamber 63 to the top of the pressure-gland 62.

The upper portion of the opening 64 is threaded as at 65 while the lower portion is formed with a smaller diameter smooth cylindrical bore 66.

The lower edge 67 of the pressure-gland 62 is provided with an internal annular groove 68 in which is mounted a compressible sealing gasket 69.

A check-valve 70 of generally conventional construction is detachably connected to the pressure-gland 62 so that it communicates, at its inner end, with the chamber 63 and can be detachably connected, at its outer end, to a hose or conduit (not shown) leading to any source of compressed air (as for example, an air compressor or pump, or a tank or reservoir of compressed air).

The bung-operating connector 31 also includes an operating member 71 having an elongated stem 72 and an uppermost handle 73.

The stem 72 is provided with an axial passageway 74 and is externally threaded at its upper end as at 75 for adjustable connection to the threads 65 of the pressure-gland 62. The threads 75—65 are somewhat coarser (that is, greater in pitch) than the threads 51—44, for reasons to be described hereinbelow.

The stem 72 is provided with an intermediate cylindrical portion 76 extending downward from the threaded portion 75 and slightly smaller in diameter. The stem 72 is also provided with a lower cylindrical portion 77 which has a still smaller diameter and which is provided, at its lowermost end, with a pair of opposed bayonet lugs 78 which are constructed and arranged to engage within the bayonet slots 57 of the valve member 50.

An O-ring 79 is mounted within an annular groove 80 formed at the upper end of the lower cylindrical portion 77 and having a protruding shoulder 80-a. Another O-ring 81 is mounted within an annular groove 82 formed generally at the center of the cylindrical portion 76; the O-ring 81 being constructed and arranged to provide a fluid-tight seal intermediate the cylindrical portion 76 of the stem 72 and the cylindrical bore 66 of the pressure-gland 62 while permitting sliding movement of the stem 72 during screwing and unscrewing rotation of the handle 73.

An apertured screw-threaded plug 83 is mounted in the top of the handle 73 in communication with the passageway 74 to permit detachable connection of a hose or conduit (not shown) leading to any conventional dispensing tap or other valve for controlling the flow of beer or other fluid.

When the full barrel 36 is received by the retailer (with the bung installed and in closed position, as described hereinabove and as shown in Figures 3 and 4, the bung-operating connector 31 is attached thereto in the following manner:

The operating member 71 is first turned relative to the pressure-gland 62 so that the handle 73 is generally in the position shown in Figure 1 (wherein it is more or less adjacent the top edge of the pressure-gland). The stem 72 is then positioned above the bore 55 of the valve-member 50 so that the bayonet lugs 78 are in alignment with the bayonet slots 57, as indicated particularly in Figure 3.

The lower cylindrical portion 77 of the stem 72 is then lowered into the bore 55 as far as it will go whereupon the entire bung-operating connector 31 is turned somewhat (preferably by rotating the pressure-gland 62) to lock the bayonet lugs 78 within the lowermost circumferentially extending portions 57-a of the bayonet slots 57, in the manner indicated generally in Figure 1.

In this position the O-ring 79 is compressed between the shoulder 80-a and the top of the valve-member 50 so as to provide a fluid-tight seal intermediate the stem 72 and the valve-member 50.

The pressure-gland 62 is rotated manually so as somewhat to compress the sealing-gasket 69 intermediate the shoulder 68-a and the top of the bung 30 while maintaining a slight clearance intermediate the lower edge 67 of the pressure-gland 62 and the top surface of the bung 30. In this way, the initial fluid-tight seal and the interlocking of the bayonet-joint elements is effected while sufficient clearance is maintained to allow for movement of the pressure-gland 62 during opening of the gland, as will be hereinafter described.

As also indicated in Figure 1, the valve-member 50 remains in closed position—both the air valve 53 and the beer valve 61 remaining in lowermost position closing off the air openings 43 and the beer openings 48 respectively.

With the stem 72 thus locked to the valve-member 50, the handle 73 is then turned relative to the pressure-gland 62. This rotates the stem 72 so as to rotate the valve-member 50 and to raise it to the open position shown in Figure 2 so as to open both the air valve and the beer valve.

Since, as described above, the threads 75—65 are somewhat greater in pitch than the threads 51—44, the axial movement of the stem 72 relative to the pressure-gland 62 will be somewhat greater than the axial movement of the valve-member 50 so that during this rotation of the handle 73, the pressure-gland 62 will be moved so as to bring its lower edge 67 into abutment with the top of the bung 30; the sealing gasket 69 being compressed so as to provide a fluid-tight seal between the pressure-gland 62 and the top of the bung 30.

Compressed air is then introduced into the chamber 63 through the check-valve 70 and passes downward past the open air valve 53 and through the air openings 43 so as to build up a pressure within the upper end of the barrel 36. This pressure will force the beer up through the riser pipe 39, in a manner well known in the art, and through the openings 48 in the valve seat 46, past the open beer valve 61 and through the bore 56 and the passageway 74 and out through the apertured plug 83 and the delivery line (not shown) to the dispensing tap.

It is obvious that the beer is thus maintained under pressure whereupon it will be delivered whenever the dispensing tap is opened.

After the barrel has been emptied, the handle 73 is oppositely rotated so as to close the valve-member 50 and to raise the pressure-gland 62, as indicated in Figure 1, after which the entire bung-operating connector 31 is rotated to uncouple the stem 72 from the valve-member, whereupon the empty barrel is ready to be shipped back to the brewer.

From the foregoing it is obvious that the novel construction of the present invention provides a firm and positive connection for the bung-operating connector and permits simultaneous opening and closing of both the air valve and the beer valve, as desired.

The structure is relatively simple and inexpensive to manufacture and is strong and durable, providing adequate seals, with minimum wear, at the several fixed and moving connections.

It is apparent that the structure described above provides separate and independent passageways for the air (or other compressed gas) and the beer (or other liquid); the air passageway extending peripherally and outside of the valve-member through the body of the bung and the beer passageway extending more or less centrally through the apertured valve-member.

In Figures 5 and 6 there is shown another embodiment of the present invention employing a somewhat different valve mechanism than that described hereinabove.

Thus, the bung 100 is integrally formed with an external threaded neck 101 for detachable connection within the bung-opening and is provided with a beveled shoulder 102 which compressed an O-ring 103 fitted within the bung-opening so as to provide a fluid-tight seal.

The bung also includes a generally hollow downwardly protruding portion 104 which has a reduced internally-threaded neck 105 at its lower end for connection to the upper end of a riser pipe 106 which extends downwardly within the barrel in a manner described hereinabove.

An opening 107 is provided in the top of the bung 100 in communication with the apertured portion 104—the top opening 107 being somewhat smaller in diameter than the inner bore of the portion 104 and being spaced therefrom by an annular radially-extending shoulder 108.

A plurality of circumferentially spaced air openings 109 extend generally horizontally through the portion 104 adjacent the upper end thereof and provide communication between the inner bore of said portion 104 and the inside of the barrel.

A thin flat metal ring or washer 110 is horizontally mounted within the portion 104 and provides an inwardly protruding annular stop-shoulder.

A rotatable valve-member 111 is mounted within the portion 104. The valve-member 111 includes an externally threaded lowermost portion 112 fitting within the screw-threaded neck 105 and having an axially extending inner bore 113 open at the bottom but closed at the top by a generally circular wall 114. A plurality of circumferentially spaced radially extending openings 115 are formed in the valve-member 111 just below the wall 114 and provide communication between the inner bore 113 and the inside of the portion 104.

An outwardly-protruding radial shoulder 116 is provided on the outside of the valve-member 111 just above the circular wall 114 and a socket portion 117 having bayonet slots 118 is provided at the top of the valve-member 111.

An O-ring 119 is mounted within the portion 104 below the radial shoulder 108 but above the shoulder 116—the O-ring being pressed between said shoulders when the valve-member is in the uppermost position shown in Figure 5 so as to provide a fluid-tight seal therebetween above the level of the openings 115 and the openings 109. It is apparent that, in addition to providing an annular seal for the valve-member 111, the O-ring 119 serves to limit the upward movement of said valve-member within the bung 100.

The bung-operating connector 120 includes a pressure-gland 62-a generally like the pressure-gland 62 described hereinabove except that its cylindrical bore 66-a is somewhat larger in diameter than the threaded portion 65 (instead of being smaller as in the embodiment of Figure 1).

The bung-operating connector 120 is provided with an elongated operating member 121 having an axial inner bore 122 extending therethrough.

The operating member 121 is externally threaded as at 123 for adjustable connection with the threaded portion 65 of the pressure-gland 62-a.

Below the threaded portion 123, the operating member 121 is provided with a smooth cylindrical outer surface 124 adapted for sliding movement within the bore 66-a—the surface 124 being provided with an annular groove 125 in which is mounted an O-ring 126 which provides a fluid-tight seal.

An outwardly protruding annular shoulder 127 is provided adjacent the lower end of the surface 124 so as to limit the upward movement of the operating member relative to the pressure-gland 62-a.

A plurality of circumferentially spaced radially extending openings 128 are provided in the operating member 121 somewhat below the shoulder 127.

A pair of diametrically spaced bayonet lugs 129 are provided at the lowermost end of the operating member 121 and are constructed and arranged for detachable connection with the bayonet slots 118 of the valve member 111.

The uppermost end of the operating member 121 is formed as a reduced-diameter neck 130 to which an operating handle 131 can be welded as at 132 or otherwise permanently fastened (after the operating member has been installed within the pressure-gland 62-a by screwing it upward from the lower end thereof).

A threaded apertured plug 83 like that described hereinabove is fastened at the uppermost end of the operating member 121 to provide a detachable connection with a beer-delivery hose or conduit.

In connecting the bung-operating connector 120 to the bung 100, the operating member 121 is first rotated to its uppermost position as shown in Figure 5, after which the bayonet lugs 129 are inserted within the bayonet slots 118 whereupon the entire bung is rotated so as to lock the lugs within the slots in a manner similar to that described hereinabove in connection with the embodiment of Figure 1.

The operating handle 131 is then turned to move the operating member 121 inward with respect to the pressure-gland 62-a. This also causes rotation of the valve-member 111 from the uppermost position shown in Figure 5 to the position shown in Figure 6.

As the lower end of the operating member 121 moves within the hollow portion 104 through the top opening 107, the lower edge 127-a of the outwardly protruding annular shoulder 127 strikes the O-ring 119 and moves it downward from the uppermost position shown in Figure 5 to the position shown in Figure 6 wherein it contacts the washer 110 and, being compressed, provides an annular fluid-tight seal, somewhat below the openings 109 and above the openings 128.

In this embodiment, the threads 112 are somewhat coarser than the threads 123 so that, as the valve-member 111 moves inward, it carries the entire bung-operating connector 120 with it from the position shown in Figure 5 to that shown in Figure 6 wherein the sealing gasket or O-ring 69 is compressed so as to provide a fluid-tight seal.

It is apparent that, with the valve-member 111 in the position shown in Figure 6, compressed air can pass from the check-valve 70 downward through the radial clearance intermediate the top opening 107 and the surface 124 (which is appreciably smaller in diameter) into the upper end of the hollow portion 104 through the air-openings 109 and into the top of the barrel 36.

At the same time, the beer, under the pressure of the air, is forced upward through the riser pipe 105 to the bore 113, through the radial openings 115 into the lower part of the hollow portion 104, through the openings 128, the inner bore 122 and the hollow plug 83 to the beer delivery hose or conduit. Thus, it is apparent that, with the valve member 111 in the open position shown in Figure 6, the O-ring 119 serves to provide a fluid-tight seal between the beer-carrying lower part of the hollow portion 104 and the air-carrying upper part thereof.

When the barrel 36 is emptied, the operating handle 131 is oppositely rotated to the position shown in Figure 5, the upper movement of the valve-member 111 causes its shoulder 116 to move the O-ring 119 back to its original position where it closes off both the air-openings 109 and the beer openings 115.

Thereafter, rotation of the entire bung-operating connector 120 will disengage the bayonet lugs 129 from the bayonet slots 118 to permit removal of the bung-operating connector 120.

The empty barrel is then returned to the brewer who removes the bung 100 to clean and refill the barrel and, thereafter, reinserts the bung with the valve in the closed position of Figure 5 so that it is ready to be shipped back to the retailer who can then connect the bung-operating connector in the manner described hereinabove.

From the foregoing description, it is apparent that, in this embodiment, separate and independent air (or other compressed gas) and beer (or other liquid) passageways are again provided through the bushing when the valve-member is in open position—the air passageway extending outside and peripherally of the valve-member and the beer passageway extending more or less centrally through the apertured valve-member. The O-ring 119 serves to separate the two passageways when in its lowermost compressed position as shown in Figure 6. Thus, in the position shown in Figure 6, the O-ring 119 is compressed into fluid-tight sealing relationship intermediate the inner bore 104 and the outer periphery of the operating member 121 at a level below the air openings 109 and above the openings 128 in the operating member 121. On the other hand, when the O-ring 119 is in its uppermost compressed valve-closing position shown in Figure 5, it is compressed into fluid-tight sealing relationship with the inner bore 104 and the outer periphery of the upper end of the valve-member 111 at a level below that of the openings 128 but above the level of the air openings 109 and the openings 115 in the valve-member 111. As is apparent in Figure 5, the openings 109 and 115 are in communication when the O-ring 119 is in this valve-closing position so that the air-inlet passageway and the beer outlet passageway are no longer separate and distinct as is the case when the O-ring is in its lowermost compressed position shown in Figure 6.

In Figure 7 there is shown a closure-and-tapping assembly generally like that described hereinabove in connection with the embodiment of Figures 5 and 6 (with the parts shown in the same relationship as in Figure 6), except that, in place of the bayonet-connection 118—129, a screw-threaded connection 133 is provided for the socket-portion 117-a and the operating member 121-a.

As can be seen in Figure 7, the screw threads 133 have a smaller pitch than the threads 112 on the valve-member 111. Thus, the screw-threaded connection 133 cannot accidentally be opened before the operating member 121 is rotated to the uppermost position (corresponding to that of Figure 5) so as to close the valve-member 111. That is, the differences in pitch will cause the screw threads 133 to bind if they begin to rotate before the threads 112. Except as described hereinabove, the construction and operation of the embodiment of Figure 7 are the same as described in connection with the modification of Figures 5 and 6.

In Figures 8 and 9 there is shown still another embodiment of the present invention which includes a bung-operating connector 31 like that described hereinabove in connection with the embodiment of Figure 1 and a bung 134 which is more nearly like the bung 100 of Figure 5 but which differs therefrom in several respects, as will be discussed hereinbelow.

Thus, the bung 134 includes a generally 2-piece housing made up of a downwardly-protruding generally cup-shaped portion 135 which is screw-threadedly connected at its upper end, as at 136, to the reduced-diameter neck-portion 137 of a cover member 138. The cover member 138 is provided with external screw threads 139 for attachment to the bung-opening and is provided with a beveled annular shoulder 140 which compresses an O-ring 141 fitted within the bung-opening so as to provide a fluid-tight seal.

The downwardly protruding portion 135 is provided with an inner chamber 142 open at its upper end and communicating, at its lower end, with a relatively coarse-pitch threaded opening 143 which in turn communicates with a smaller co-axial opening into which the upper end of a riser pipe 144 is screw-threadedly connected as at 145.

The cover member 138 is provided with a cylindrical inner bore 146 extending upward from the lower edge of the neck portion 137 and communicating with a smaller diameter opening 147 formed in the top of the cover member 138.

A plurality of air openings 148 extend from adjacent the upper end of the inner bore 146 downwardly and outwardly so as to communicate with the upper end of the barrel.

An O-ring 149 is mounted at the upper end of the inner bore 146.

A rotatable integrally formed valve member is mounted within the bung 134 and is provided with external threads 151 at its lower end for adjustable engagement with the threads 143.

The valve member 150 includes a lower axially extending bore 152 and an upper bore 153 generally co-axial with the bore 152 but separated therefrom by a transversely extending partition 154 having an outwardly protruding annular shoulder 155 upon which is mounted an O-ring 156 which is adapted to provide a fluid-tight seal intermediate said shoulder 155 and a beveled valve seat 157 formed at the lower end of the inner bore 146 of the cover member 138.

A plurality of circumferentially spaced radially extending openings 158 extend through the valve member 150 directly below the partition 154 and provide communication intermediate the upper end of the lower bore 152 and the inner chamber 142 of the downwardly protruding portion 135.

A plurality of circumferentially spaced radially extending openings 159 are formed in the valve member 150 directly above the partition 154. The openings 159 extend from the lower end of the upper bore 153 and communicate with the chamber 142 when the valve member 150 is in the lowermost position shown in Figure 8. When, however, the valve member 150 is in the uppermost position, as shown in Figure 9, the outer ends of the openings 159 terminate within the inner bore 146 of the cover member 138 and are sealed off from below by the O-ring 156 and from above by an O-ring 160 mounted within an annular groove 161 formed somewhat below the upper edge of the valve member 150 and providing a fluid-tight seal.

The upper bore 153 which is somewhat smaller in diameter than the top opening 147 (which in turn is smaller than the inner bore 146) is provided with bayonet slots 162 constructed and arranged for detachable connection with the bayonet lugs 78 described hereinabove. When the valve member 150 is in its uppermost position, as shown in Figure 9, it can be seen that the upper end of the riser pipe 144 is closed off by the O-ring 156 (which is compressed between the shoulder 155 and the beveled valve seat 157). At the same time, the air openings 148 are closed off by the O-rings 149 and 160 while the beer openings 159 are closed off by the O-rings 160 and 156.

When the bung-operating connector 31 is connected and rotated in the manner described hereinabove in connection with the embodiment of Figure 1, the valve member 150 is moved downward from the uppermost position shown in Figure 9 to the position shown in Figure 8 thereby unseating the O-ring 156 and moving the top edge of the valve member below the upper and inner ends of air openings 148.

This permits flow of compressed air downward through the annular clearance between the top opening 147 and the stem 72, into the upper end of the bore 146, through the air openings 148 so as to build up a pressure within the top of the barrel. This pressure forces the beer up through the riser pipe 144, the lower bore 152 and the openings 158 into the chamber 142 from which it flows through the openings 159 and the upper bore 153 into the passageway 74 extending through the stem 72 of the operating member 71 of the coupling member 31.

Opposite rotation of the operating member 75 will move the valve member 150 to the closed position of Figure 9 after which the bayonet lugs are disengaged from the bayonet slots to permit the empty barrel to be sent back for cleaning and refilling.

The construction of Figures 8 and 9 is more or less tamper-proof with respect to the valve member. That is, the valve member is held in place by the inwardly protruding annular flange formed by the reduced-diameter top opening 147 to prevent removal of the valve member (as distinguished from the embodiment of Figure 1 wherein there is no positive lock for the valve member so that it could be unscrewed from the bung 30 by unauthorized persons).

This positive lock is made possible, of course, by the fact that the bung is constructed in two parts (namely the downwardly protruding portion 135 and the cover member 138) in place of the one-piece bung 30, which permits installation of the valve-member from the lower end of the bore 146 (instead of from the top of the bung as is necessary in the one-piece construction of Figure 1, for example).

In Figures 10 and 11 there is shown still another embodiment of the present invention which includes a bung 163 and a bung-operating connector 164.

The bung includes an integrally formed body or housing 165 having an upper socket 166 provided with bayonet slots 167.

The body 165 is externally threaded as at 168 for connection within the bung opening of the barrel and is also provided with an annular outwardly protruding shoulder 169 which is beveled and adapted to compress an O-ring 170 fitted within the bung-opening so as to provide a fluid-tight seal.

The body 165 also includes a downwardly protruding portion 171 which is provided with a generally cylindrical inner bore 172 and a reduced diameter externally threaded neck 173 at its lower end—the neck 173 being provided with an axial opening 174 communicating with the inner bore 172 and providing a passageway between said bore 172 and the upper end of the riser pipe 106.

A reduced diameter opening 175 is provided intermediate the upper end of the bore 172 and the socket 166—an inwardly protruding annular shoulder 176 being formed therebelow to act as an upper stop for an O-ring 177 slideably mounted within the upper portion of the bore 172.

An annular washer 178 of metal or the like is mounted within the bore 172 somewhat below the upper end thereof and provides an inwardly protruding bottom stop for the O-ring 177.

A plurality of circumferentially-spaced radially-extending air openings 179 are formed adjacent the upper end of the downwardly protruding portion 171. The air openings 179 provide communication between the upper end of the bore 172 (above the lowermost position of the O-ring 177, as indicated in Figure 10 but below the uppermost position of said O-ring 177, as indicated in Figure 11) and the uppermost portion of the barrel.

A valve-member 180 of metal or the like is mounted within the downwardly protruding portion 171 of the bung 163. The valve-member 180 is generally cup-shaped with a downwardly-opening recess 181 into which is fitted the upper end of a coiled spring 182, the lower end of which is seated within an annular groove 183 formed at the upper end of the opening 174.

The lowermost end of the valve-member 180 may be formed as a scalloped or slotted skirt 184 which protrudes outward somewhat to provide an annular shoulder 185 which bears against the O-ring 177 when the valve-member is in uppermost position as shown in Figure 11, so as to compress it against the annular shoulder 176 and to provide a fluid-tight seal intermediate the valve-member and the bore 172 (above the level of the air openings 179).

The upper end of the valve-member 180 is formed as a reduced-diameter generally cylindrical head 186 having an annular shoulder 187 extending therearound.

The bung-operating connector 164 includes a main body member or housing 188 having bayonet lugs 189 adapted to engage with the bayonet slots 167 in the socket 166.

An O-ring 190 is fitted within a recess 191 formed in the underside of the body member 188 so as to provide a fluid-tight seal when the bung-operating connector 164 is connected to the bung 163.

The body member 188 is also provided with an off-center conduit 192 communicating at its lower end with the recess 191 and adapted screw-threadedly to receive the check-valve 70.

The body member 188 is provided with a central axial bore 193 having an inwardly protruding annular shoulder 194 formed adjacent its lower end and having an annular metal washer 195 providing an inwardly protruding stop adjacent the upper end thereof.

The body member 188 is provided with an external handle 196 and is externally screw-threaded at its upper end, as at 197, for adjustable engagement with a centrally-apertured internally-threaded cap 198 having a handle 199.

An elongated stem 200 having an axial opening 201 is constructed and arranged for slideable movement within the central bore 193 of the body member 188—the stem 200 having a cylindrical intermediate portion 202 of generally the same diameter as the bore 193 and carrying an O-ring 203 at its lower end to provide a moveable fluid-tight seal—the downward movement of the stem 200 being limited by the shoulder 194, as indicated in Figure 10.

Below the intermediate portion 202, the stem 200 is provided with a somewhat reduced portion 204 which is provided with a scalloped or notched lowermost end 205 which is adapted to fit over the top of the head 186 of the valve-member 180 (with the upper ends of the scallops or notches open, as indicated in Figure 10) and to abut the shoulder 187 so that downward movement of the stem 200 will force the valve-member 180 downward.

The portion 204 of the stem 200 is provided with an outwardly protruding shoulder 206 which is constructed and arranged to contact the upper edge of the O-ring 177 and to move it downward from the uppermost position shown in Figure 11 to the lowermost position shown in Figure 10 (wherein it provides a fluid-tight seal intermediate the stem 200 and the inner bore 172 below the level of the air openings 179 but above the lowermost scalloped end of the portion 204).

The stem 200 is provided with another reduced diameter portion 207 above the portion 202 and extending through the apertured cap 198.

The portion 207 is provided with an integrally formed outwardly protruding annular shoulder 208 against which the underside of the cap 198 is adapted to bear—a washer 209 being mounted on the portion 207 just above the cap 198.

This type of mounting permits the cap 198 to rotate about the portion 207 when it is screwed up or down upon the threads 197 of the body member 188.

It is apparent that the shoulder 208 and the washer 209 provide an axial interlock between the cap 198 and the stem 200 so that rotation of the handle 199 will cause the stem 200 to move up or down relative to the body member 188.

In operation, the bung-operating connector 164 is first connected to the bung 163 (which is in the closed position shown in Figure 11) by fitting the bayonet lugs 189 into the bayonet slots 167 and by rotating the body member 188 by means of the handle 196.

Thereafter the handle 199 is turned to move it from the position shown in dash-dot lines in Figure 10 to the position shown in solid lines so as to move the valve-member 180 downward from the position shown in Fig. 11 to the position shown in Figure 10.

With the valve-member 180 in this last-mentioned position, it is obvious that there is a continuous air passageway from the check-valve 70 to the upper end of the barrel (via the conduit 192, the opening 175, the upper end of the bore 172 and the air openings 179) so that air pressure can be exerted upon the beer or other liquid to force it up through the riser-pipe 106, the opening 174, and the lower end of the bore 172, through the upper portions of the scallops 205 and into the axial opening 201 of the stem 200 from which it can pass into the beer delivery line as described hereinabove.

When the barrel is empty, the handle 199 is oppositely rotated so as to move the stem 200 upward and to permit the valve-member 180 to return to its uppermost position, under the action of its spring 182, after which the bung-operating connector 164 is disconnected by means of the handle 196.

With the valve-member 180 in uppermost position, as indicated in Figure 11, it is apparent that both the air openings 179 and the riser-pipe 106 are closed off so that the barrel is fluid-tight, in case it is desired to disconnect the coupling member before the barrel is completely empty. In this position, the air openings 179 are in communication with the beer passageway as in the embodiment of Figure 5.

The bung 163 can be removed for cleaning and refilling in a manner similar to that described hereinabove.

In Figures 12 and 13 there is shown a still further embodiment of the present invention which includes a bung 210 and a bung-operating connector 164-a which is generally like the bung-operating connector 164 of Figure 10 except that, in place of the shoulder 206, the portion 204-a of the stem 200-a is provided with a metal washer 211 and an O-ring 212 fitted snugly about the portion 204-a directly below the washer 211.

The bushing member 210 includes a generally integrally formed body member 213 which is externally threaded at 214 (for connection within the bung-opening of the barrel) and an uppermost annular beveled shoulder 215 adapted to bear against an O-ring 216 disposed within the bung-opening so as to provide a fluid-tight seal.

The body member 213 also includes a generally hollow downwardly protruding portion 217 having an internally threaded neck 218 at its lower end for attachment to a riser-pipe 39.

The lower end of the hollow portion 217 is formed as a frusto-conical surface 219 which serves as a spring support, as will be described hereinbelow.

Above the surface 219, the portion 217 is provided with a cylindrical bore 220 extending upward for somewhat less than half the axial dimension of said portion 217.

A somewhat larger-diameter cylindrical bore 221 extends upward from the bore 220 and is separated therefrom by an inwardly protruding annular shoulder 222.

The portion 217 is provided with a plurality of circumferentially-spaced, generally radially extending air-openings 223 adjacent its upper end and communicating with the bore 221 somewhat below the upper end thereof.

The body member 213 is provided with a top socket 224 having bayonet slots 225.

An opening 226 extends axially intermediate the socket 224 and the upper end of the bore 221—the opening 226 being somewhat larger in diameter than the bore 221 and being separated therefrom by an annular inwardly-protruding shoulder 227 upon which is seated an annular metal washer 228 which is generally L-shaped in cross-section and which is retained in place by a ring 229 set in a groove 230 formed in the opening 226 just above the top of the washer 228.

Slideably mounted within the bore 221 is a valve-member 231 which is centrally apertured as at 232 and which is grooved to receive two O-rings 233 and 234. The O-ring 233 is adapted to provide a fluid-tight seal intermediate the upper and outer edge of the valve-member 231 and the bore 221 while the O-ring 234 is adapted to provide a fluid-tight seal intermediate the beveled lower and inner edge 235 of the valve-member 231 and the correspondingly beveled periphery 236 of a moveable valve-seat 237.

A spring 238 is constructed and arranged to tension the valve-seat 237 to the uppermost position shown in Figure 12—the spring 238 including a continuous circular upper edge 239 fitting within a socket 240 formed on the underside of the valve-seat 237 and also includes a plurality of circumferentially-distributed downwardly and outwardly extending curved fingers 241 which sit against the upper end of the frusto-conical surface 219.

The valve-seat 237 also includes a top, flat, generally circular portion 242 against which the scalloped and lower end 205 of the stem 200-a abuts when the coupling member 164-a is connected to the bushing member 210.

The spring 238 normally retains the valve-seat 237 and the valve-member 231 in the uppermost position shown in Figure 12 with the O-ring 233 closing off the air openings 223 and the O-ring 234 closing off the beer passageway.

When the bung-operating connector 164-a is connected and its stem 200-a is moved downward (in the manner described hereinabove in connection with the embodiment of Figures 10 and 11) the scalloped lower end 205 first strikes the flat portion 242 of the valve-seat 237 thereby forcing it downward against the pressure of its spring 238 (which is bowed to the shape shown in Figure 13) thereby unseating the valve-member 231 from the valve-seat 237 and opening the beer passageway.

A short distance farther during the downward movement of the stem 200-a, the O-ring 212 strikes the top of the valve-member 231 and moves it downward until its lower edge seats against the shoulder 222 (in which position the valve-member 231 is still in unseated position relative to the valve-seat 237) which moves the O-ring 233 downward beyond the air-openings 223.

It is apparent that with the valve-seat 237 and the valve-member 231 in the position shown in Figure 13, compressed air can enter the top of the barrel (via the conduit 192, the opening 225, the upper portion of the bore 221 and the air-openings 223) so as to force the beer upward through the riser-pipe 39 and into the lower part of the downwardly protruding portion 217, from which it passes intermediate the valve-member 231 and the valve-seat 237, through the scallops or notches 205 and into the axial opening 201 of the stem 200-a from which it passes to the beer delivery line as described hereinabove.

When the bung-operating connector 164-a is disconnected, the spring 238 first forces the valve-seat 237 against the valve 231 and thereafter moves the valve upward to the position shown in Figure 12 so as to close off both the air passageway and the beer passageway.

In Figures 14 and 15 there is shown a somewhat modified form of the closure-and-tapping assembly of Figures 12 and 13.

The embodiment of Figures 14 and 15 includes a bung 243 and a bung-operating connector 244.

The bushing member includes an integrally formed body member or housing 245 which is screw-threaded as at 246 for detachable engagement within the bung-opening and which is provided with an uppermost beveled annular shoulder 247 constructed and arranged to compress an O-ring 248 disposed within the bung-opening so as to provide a fluid-tight seal.

The body member 245 includes a downwardly protruding portion 249 having an internally threaded reduced-diameter neck 250 at its lower end for engagement with the riser-pipe 39, the uppermost end of which being constructed and arranged to protrude somewhat as at 251 beyond the bottom wall 252 formed on the inside of the downwardly protruding portion 249 so as to provide a centering support for a helical spring to be hereinafter described.

A cylindrical inner bore 253 is provided within the lower part of the downwardly protruding portion 249 while a cylindrical bore 254 is provided in the upper part thereof—the bore 254 being somewhat larger in diameter than the bore 253 and being spaced therefrom by an upwardly-directed annular shoulder 255 which forms a bottom stop for a valve-member to be hereinafter described.

A plurality of circumferentially-spaced generally radially extending air-openings 256 are formed in the downwardly protruding portion 249 somewhat above the shoulder 255 so as to provide communication between the upper bore 254 and the top of the barrel.

A ring member 257 is mounted within the upper bore 254 generally adjacent the top end thereof—the ring member 257 having an annular beveled edge 258 on its underside and being constructed and arranged to provide a top-stop for the valve-member as will be described below.

A socket 259 is formed at the top of the body member 245 in communication with the upper bore 254 and is provided with bayonet slots 260.

A valve-member 261 is slideably mounted within the upper bore 254 and is provided with an outer O-ring 262 (providing a fluid-tight seal between the valve-member and the bore 254) and an inner O-ring 263 set within a tapered central opening 264 of said valve-member 261.

A generally cup-shaped valve-seat 265 is mounted within said downwardly-protruding portion 249 below the valve-member 261. The valve-seat includes a generally flat, circular top 266, a frusto-conical surface 267 and a lowermost outwardly-protruding annular shoulder 268 which is provided with a plurality of circumferentially distributed notches 268-a on its outer periphery. An annular groove 269 is formed on the underside of the shoulder 268 and is adapted to receive the upper end of a helical spring 270, the lower smaller end of which is fitted about the protruding upper end 251 of the riser-pipe 39 thereby to support and center the spring normally to retain both the valve-seat 265 and the valve-member 261 in the uppermost position shown in Figure 14, wherein the top 266 of the valve-seat 265 is generally flush with the top of the valve-member 261 and wherein the frusto-conical surface 267 fills the central opening 264 of the valve-member 261 with the inner O-ring 263 providing a fluid-tight seal therebetween.

When the valve-seat 265 is moved to its lowermost position as shown in Figure 15 (in a manner to be more fully described hereinbelow) the annular shoulder 268 slides within the lower bore 253.

The bung-operating connector 244 includes a body member 271 provided with bayonet lugs 272 at its lower end for detachable engagement with the bayonet slots 260 and having an O-ring 273 set within a groove 274 formed in the bottom thereof so as to provide a fluid-tight seal within the socket 259.

The body member 271 is provided with an off-center air conduit 275 which communicates with the screw-threadedly attached check-valve 70. The body member 271 also includes a handle 276 to permit it to be attached to and detached from the socket 259.

The body member 271 is centrally apertured and includes a lowermost internally threaded portion 277, a relatively short cylindrical bore 278 co-axial with the threaded portion 277 and a slightly larger-diameter bore 279 co-axial with the bore 278 and spaced therefrom by an inclined shoulder 280.

The bung-operating connector 244 also includes an operating member 281 having a handle 282 at its upper end and having an elongated stem 283.

The stem 283 is provided with a cylindrical outer surface 284 at its upper end adapted to fit slidably within the upper bore 279—an O-ring 285 being mounted within an annular groove 286 formed at the lower end of the surface 284 so as to provide a fluid-tight seal between the stem 283 and the bore 278.

Below the cylindrical surface 284, the stem 283 is provided with an externally threaded portion 287 providing adjustable engagement with the threaded portion 277 of the body member 271.

A washer 288 is fitted about the stem 283 below the threaded portion 287 so as to provide an upwardly protruding annular shoulder limiting the upward movement of the operating member 281 relative to the body member 271.

The stem 283 is provided with a downwardly protruding annular shoulder 289, on the underside of which is disposed an O-ring 290 which fits snugly about the reduced-diameter lower end of the stem 283—the lowermost edge of the stem being scalloped or notched as at 292 to provide communication between the outside of the stem and the central axial opening 293 extending through the operating member 281.

When it is desired to connect the bung-operating connector 244 to the bung 243, the handle 282 is first turned to move the operating member 281 to the uppermost position shown in Figure 14. Thereafter the handle 276 is turned to lock the body member 271 within the socket 259.

The handle 282 is then turned to move the stem 283 downward. This downward movement of the stem 283 first forces the valve-seat 265 downward and away from the valve-member 261. Continued downward movement of the operating member 281 brings the O-ring 290 into contact with the upper edge of the valve-member 261 so as to move the valve-member down to its lowermost position shown in Figure 15 (the O-ring 290 providing a fluid-tight seal between the stem 283 and the valve-member 261).

In the position shown in Figure 15 (wherein the valve-member 261 is below the level of the air-openings 256), there is direct communication between the check-valve 70 and the inside of the barrel (through the conduit 275, the socket 259, the bore 254 and the air-openings 256) so that air pressure is exerted upon the top of the beer (or other liquid) thereby forcing it up through the riser-pipe 39, into the lower end of the bore 253, through the notches 268–a to the upper part of the bore 253, through the opening 264 and the scallops 292 and into the axial opening 293 of the operating member 281 from which it passes to the beer delivery line as described above.

Opposite rotation of the operating handle 282 will permit the valve-seat 265 to be moved back into contact with the valve-member 261, after which the helical spring 270 forces both the valve-seat and the valve-member upward to the original uppermost closed position shown in Figure 14 wherein the air passageway is closed off by the outer O-ring 262 and the beer passageway is closed off by the inner O-ring 263. In this position the air openings 256 are, again, in communication with the beer passageway.

In Figures 16 and 17 there is shown a still further embodiment of the present invention wherein the bung-operating connector is shown fragmentarily and may have the general construction of any of the forms shown in Figures 10, 12 and 14—the lowermost end of the stem of its operating member being reduced in diameter as at 294 and having an O-ring 295 for fluid-tight connection with the bung 296 as will be described hereinbelow.

The bung 296 includes a top cover 297 adapted for screw-threaded fluid-tight engagement within the bung opening in a manner similar to that described hereinabove. The top cover 297 is provided with an integrally formed downwardly protruding internally threaded annular flange 297–a. The bung also includes a generally cup-shaped portion 298 having an inner chamber 299 and being screw-threadedly connected, at its bottom, to the riser-pipe 39. The upper open end of the portion 298 is reduced in diameter and externally threaded as at 298–a for engagement with the flange 297–a.

The top cover 297 is provided with a downwardly protruding neck 300 having a central axial opening 301 communicating with the upper end of the chamber 299.

A plurality of circumferentially spaced radially extending air-openings 302 are formed in the flange 297–a.

A valve-member 303 is movably mounted within the chamber 299 and is connected therewithin by a centrally-apertured generally disc-shaped resilient diaphragm 304 of rubber or similar material having its peripheral edge firmly held intermediate the flange 297–a and the uppermost screw-threaded end 298–a.

The valve-member 303 may be integrally formed and includes a central generally cylindrical stem-portion 305 and a flange-portion 306 providing an upwardly directed annular shoulder 307 radially spaced from the stem portion by an annular groove 308.

The inner periphery of the centrally apertured diaphragm 304 is fastened to the stem portion 305 as at 309 generally in line with the shoulder 307.

A plurality of circumferentially-spaced generally radially extending openings 310 provide communication between the groove 308 and the lowermost cylindrical inner bore 311 of the stem portion 305 is provided with a somewhat larger diameter bore 312 which is separated from the bore 311 by an upwardly directed annular shoulder 313, while another annular shoulder 314 is provided at the top of the stem portion 305.

A coil spring 315 bears against the underside of the valve-member 303 and is seated against the bottom wall of the portion 298 so as normally to maintain the valve-member in the uppermost position shown in Figure 16, wherein the diaphragm 304 is in generally flat horizontal position providing a fluid-tight seal intermediate the annular shoulder 307 and the flange portion 306 and a complementary downwardly-directed annular shoulder 300–a formed on the underside of the neck 300.

When the bung-operating connector is attached, the lowermost end 294 of the stem is fitted within the upper bore 312 of the stem portion 305 (with the O-ring providing a fluid-tight seal therebetween) after which downward movement of the operating handle forces the valve-member 303 downward (against the pressure of its spring 315) to the position shown in Figure 17 wherein the resilient diaphragm 304 assumes a generally concave dished position breaking the seal between the shoulders 307 and 300–a.

This opens the air passageway (via the opening 301, the upper portion of the chamber 299 and the air openings 302) to permit entry of air under pressure within the upper end of the barrel which in turn forces the beer up through the riser-pipe 39 into the lower portion of the chamber 299, within the groove 308, through the openings 310 and into the bore 311 from which it enters the axial opening of the operating member and from there passes to the beer delivery hose or conduit.

When the bung-operating connector is removed, the spring 315 will return the valve-member 303 to its original position as shown in Figure 16 thereby closing off both the air passageway and the beer passageway.

In Figures 18 and 19 there is shown a modification of the embodiment of Figures 16 and 17 wherein the diaphragm 304 is replaced by a valve-disc 316 which is centrally apertured so as to fit snugly about the stem portion 305 and which is slideably disposed within a cylindrical bore 317 formed within the upper portion of the chamber 299—the bore 317 being slightly larger in diameter than the remainder of said chamber and being spaced therefrom by an upwardly directed shoulder 318 which forms a bottom stop for the aforesaid valve-disc.

The valve-disc 316 is of generally 3-ply construction including top and bottom discs 319 of resilient material capable of forming fluid-tight seals with the stem portion 305 and the bore 317 and a center disc 320 of metal or the like to which the outer discs are more or less permanently bonded and which terminates slightly short of the outer and inner peripheries of the valve disc so as not to interfere with the sealing action of the resilient discs 319.

In this embodiment, an outwardly protruding annular shoulder 321 is provided at the upper end of the stem portion 305.

It is apparent that, with the valve-member 303 retained in uppermost position by the spring 315, as shown in Figure 18, the valve-disc 316 seals off the top of the groove 308 as well as the inner ends of the air-openings 302.

When the bung-operating connector is attached (the reduced lower end 294 of the stem being inserted within the upper bore 312 of the stem portion 305 as indicated in Figure 18) and the operating handle is then turned to move the stem downward, the valve-member 303 is first forced downward away from the valve-disc (so as to unseal the groove 308) after which the top shoulder 321 strikes the upper edge of the valve-disc 316 and moves it from the uppermost position shown in Figure 18 to the lowermost position shown in Figure 19, wherein its lower edge sits against the annular shoulder 318 and wherein the air openings 302 are unsealed.

Compressed air is then free to enter the upper end of the barrel, etc. from the check-valve 70 and the beer is free to move upward past the valve-member and into the axial opening of the operating member in the manner described hereinabove in connection with the embodiment of Figures 16 and 17.

When the barrel has been emptied, the operating handle is oppositely turned so as to permit the valve-member to be free to move upward by its spring 315 until its shoulder 307 strikes the underside of the valve-disc 316 which is thereafter raised along with the valve-member until it reaches its original position as shown in Figure 18.

In Figures 20 and 21 there is shown still a further embodiment of the present invention.

The bung-operating connector of this embodiment may, again, be any one of the forms shown in Figures 10, 12 and 14 except that the reduced lower end 322 is provided with a generally flat circular bottom wall 323 and is provided with one or more openings 324 providing communication with the inner axial opening 325 of the operating member. A bung 326 includes a top cover 297 and a portion 298 generally like those of Figure 18, except that the bore 317-a is made to extend down somewhat farther and is given a somewhat greater diameter than the bore 317.

Mounted within the chamber 299 is a resilient valve-seat 327 of spring steel or the like having a generally flat circular top wall 328, an annular groove 329 formed just below the top wall 328 and a plurality of circumferentially-distributed downwardly and outwardly bent finger portions 331 which are seated, at their lower ends, within an annular groove 332 formed within the chamber 299. The groove 329 carries an O-ring 330.

An O-ring 333 is fitted within the annular flange 297-a which, in this embodiment, is provided with a beveled annular edge 334 against which the O-ring can be forced to form a fluid-tight seal.

A second O-ring 335 is disposed at the lower end of the bore 317-a adjacent a similar beveled edge 336 formed at the bottom of said bore 317-a.

Slideably mounted within the bore 317-a is a piston-member 337 which is centrally apertured to receive the reduced lower end 322 (the O-ring 322-a mounted just above the portion 322 providing a fluid-tight seal therewith) and which carries an O-ring 338 mounted within an annular groove 339 formed about the outer periphery of said piston-member 337 thereby providing a fluid-tight seal intermediate the piston-member 337 and the bore 317-a.

A resilient valve-seat 327 is normally in the generally upright extended position shown in Figure 20 wherein it maintains the piston-member 337 in uppermost position. In this position, the O-ring 330 seals off the inner opening of the piston-member 337 while the O-ring 338 maintains an outer peripheral seal and, at the same time, the uppermost ring 333 forms a seal at the upper outer edge of the piston-member (above the level of the air-openings 302), the inner ends of which are thus sealed off intermediate the O-rings 333 and 338.

When the bung-operating connector is attached with its reduced lower end 322 inserted within (and extending slightly downward beyond) the central opening of the piston-member 337, the bottom wall 323 first contacts the top wall 328 and forces it (the finger portions 331 yielding and bending into a reversely-curved configuration) so as to move the valve-seat away from the piston-member 337.

When the O-ring 322-a strikes the upper edge of the piston-member 337, the latter is also moved downward within the bore 317-a until it strikes the O-ring 335, in the position indicated in Figure 21.

As can be seen in Figure 21, the openings 324 in the reduced lower end 322 communicate with that portion of the chamber 299 below the bore 317-a so as to provide a beer passageway from the riser-pipe 39 to the axial opening of the operating member.

In this last-mentioned position, the piston-member is below the level of the air-openings 302 so that compressed air is free to flow from the coupling member into the upper end of the barrel so as to exert pressure upon the beer or other liquid and to force it up through the riser-pipe 39.

When the operating member is removed, the resilience of the valve-seat 327 causes it to spring upward until its O-ring 330 contacts the lower edge of the central opening of the piston 337 and thereafter the piston member is also forced upward to its original position shown in Figure 20.

In Figures 22 and 23 there is disclosed a modified form of bung-operating connector 340 which is shown as used with the bung 100 disclosed in Figure 5 and described hereinabove.

The coupling member 120 includes a pressure-gland 341 which may be integrally constructed of relatively thin resilient sheet-metal or the like (or which, instead, may be constructed of molded rubber or other resilient plastic material) formed into a generally cup-shaped configuration. The pressure-gland includes an inwardly and upwardly extending annular flange 342 at its lower periphery within which is disposed an O-ring 343.

The pressure-gland 341 also includes an integrally formed annular flange 344 extending downwardly from its top and providing a central axial opening.

The bung-operating connector 340 also includes an operating member 345 having an axial inner bore 346 extending therethrough with an apertured screw-threaded plug 347 provided at its upper end for connection to the beer delivery line (not shown).

The operating member 345 is provided with a reduced-diameter stem 348 at its lower end with an annular downwardly-directed shoulder 349 formed at the upper end of said stem.

The stem 348 is adapted to be inserted within the opening formed by the top flange 344 of the resilient pressure-gland 341.

Thereafter, an O-ring 350 is positioned upon the stem from the lower end thereof adjacent the lowermost outwardly-directed annular edge 351 of said flange 344. A metal washer 352 is then placed in position within an annular groove 353 formed in said stem 348 slightly below the lowermost edge 351 of the flange 344.

The O-ring 350 is compressed intermediate the edge 351 and the washer 352 so as to provide a fluid-tight seal intermediate the stem 348 and the pressure-gland 341.

The operating member 345 is thus free to rotate relative to said pressure-gland 341 which, however, is locked to the stem 348 (by the shoulder 349 and the O-ring 350) for axial movement therewith.

The lowermost end of the stem 348 is externally screw-threaded as at 354 whereby an internally-threaded connecting tip 355 can be attached thereto after installation of the O-ring 350 as described hereinabove.

The screw-threaded end 354 is provided with a plurality of circumferentially-distributed radially extending slots 356 while the connecting tip 355 is provided with similar slots 357 which are brought into at least partial alignment with the slots 356 so as to provide radial passageways from the lowermost end of the inner bore 346 through the connecting tip 355.

The connecting tip 355 is provided with outwardly-extending diametrically opposed bayonet lugs 358 which are constructed and arranged for detachable connection with the bayonet slots 118 of the valve-member 111 in the manner described hereinabove in connection with the embodiment of Figures 5 and 6.

The connecting tip 355 is also provided with an annular outwardly extending shoulder 359 disposed somewhat above the slots 357 and constructed and arranged to bear against the O-ring 119 in a manner similar to the lower edge 127-a of the operating member 121 shown in Figures 5 and 6.

The resilient pressure-gland 341 is provided with a check-valve 360 for connection to an air-inlet line (not shown); a gasket 361 disposed on the inner side of the pressure-gland 341 providing an annular fluid-tight seal for said check-valve.

In operation, the operating-member 345 is connected to the bung by inserting the bayonet lugs 348 within the bayonet slots 118 and the operating member 345 rotated by its handle 345-a so as to lock the bayonet lugs within the slots in a manner analogous to that described in connection with the embodiment of Figures 5 and 6.

This preliminary rotation of the operating member causes a slight flexing of the resilient pressure-gland 341—the O-ring 343 providing an initial fluid-tight seal intermediate the pressure-gland 341 and the upper surface of the bushing member 100.

Further rotation of the operating handle 345-a causes inward rotation of the valve-member 111 in a manner analogous to that of the embodiment of Figures 5 and 6 so as to open the beer passageway and the air passageway.

During this rotation, the operating member 345 moves axially downward so that the shoulder 349 forces the upper edge of the resilient pressure-gland 341 downward causing a greater flexing of the pressure-gland so that, when the valve is in its open position, the pressure-gland is in the somewhat flattened flexed position shown in Figure 23 wherein it bears firmly against the upper surface of the bushing member and provides a positive fluid-tight seal therewith.

With the valve in open position, the air under pressure as introduced into the pressure-gland 341 from the check-valve 360 is introduced into the upper end of the barrel and forces the beer or other liquid upward through the beer passageway, through the aligned slots 357 and 356 and into the bore 346 from which it passes to the beer delivery line, in a manner analogous to that described hereinabove in connection with the embodiment of Figures 5 and 6.

When the operating handle 345-a is turned in the opposite direction, the valve-member 111 is closed—the operating member 345 and the pressure-gland 341 returning to the position shown in Figure 22. Further rotation of the operating handle 345-a disconnects the bayonet lugs 358 from the bayonet slots and permits detachment of the bung-operating connector 340 from the bung 100. The embodiment of Figures 22 and 23 has the advantage of being extremely simple and inexpensive to manufacture inasmuch as it eliminates the threaded connection intermediate the operating member and the pressure gland and, instead, substitutes a low-cost resilient pressure-gland which takes up the axial movement of the operating-member during opening and closing rotation thereof.

In Figures 24 and 25 there is shown a modification of the embodiment of Figures 22 and 23 described above, wherein the pressure-gland, instead of being inherently resilient, is spring-tensioned to sealing position.

Thus, the embodiment of Figures 24 and 25 includes a bung-operating connector 362 and a bung 100 identical with those shown in Figures 5-6 and 22-23.

In this embodiment the pressure-gland 363 may be formed as a rigid casting or may be otherwise formed of metal or the like. The pressure-gland has a lowermost annular flange 364 provided with a groove 365 in which is mounted an O-ring 366.

The pressure-gland 363 is provided with an axial opening 367 and an uppermost cylindrical portion 368.

An annular groove 369 is formed generally intermediate the ends of the axial opening 367 and carries an O-ring 370. The pressure-gland 363 is also provided with an air check-valve 70 similar to that described hereinabove in connection with the embodiment of Figure 5.

The bung-operating connector 362 also includes an operating member 371 having a handle 372 and an annular downwardly-directed flange 373.

An elongated stem-portion 374 having an axial bore 375 extends downward beyond the flange 373 in radially-spaced relationship thereto. An apertured plug member 376 is mounted at the top of the operating member 371, communicating with the upper end of the bore 375 for detachable connection to a beer delivery line (not shown).

The stem 374 is constructed and arranged to extend through the axial opening 367 of the pressure-gland 363 whereby the O-ring 370 provides a fluid-tight seal therebetween while permitting rotary and axial movement of the stem relative to the pressure-gland 363. The upper end of the cylindrical portion 368 of the pressure-gland 363 extends upward somewhat within the cylindrical flange 373 of the operating member 371—a helical spring 377 being disposed within the flange 373 and being constructed and arranged to urge the pressure-gland 363 downward along the stem 374.

The stem 374 carries a washer 378 somewhat above its lower end—the washer 378 serving to limit the spring-actuating movement of the pressure-gland relative to said stem.

The lowermost end of the stem 374 is externally threaded as at 379 and is provided with a plurality of circumferentially-distributed radially extending slots 380 similar to the slots 356 of the embodiment of Figures 22 and 23.

A connecting tip 355 identical with that shown in Figures 22 and 23 is constructed and arranged to be connected to the lowermost threaded end 379 of the stem 374.

In operation, the bayonet lugs 358 of the connecting tip 355 are first inserted within the bayonet slots of the valve-member 111 after which the operating handle 372 is turned to lock the lugs in position.

With the operating member thus locked to the bung as indicated in Figure 24, the O-ring 366 of the pressure-gland 363 is maintained in fluid-tight sealing relationship to the upper surface of the pressure-gland under the action of the helical spring 377 which is made sufficiently strong to exert adequate sealing pressure.

The operating handle 372 is then turned further to open the valve in the manner described hereinabove in connection with the embodiment of Figures 22 and 23—the operating member 371 moving axially downward relative to the pressure-gland 363 during this operation.

When the valve-member 111 is in the open position shown in Figure 25, it can be seen that the spring 377 has been further compressed from the position shown in Figure 24 so as to exert somewhat greater sealing pressure upon the O-ring 366 so as to ensure a firm fluid-tight seal.

With the valve in open position, the air passageway and beer passageway are open so as to permit flow of beer, under pressure, to the beer delivery line, in the manner described hereinabove, in connection with the embodiment of Figures 22 and 23.

When it is desired to close the valve-member 111 the operating handle 372 is oppositely rotated so as to bring the operating member 371 back to the position shown in Figure 24, after which further rotation of the operating handle will detach the bung-operating connector 362 from the bung 100.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described our invention, we claim as new and desire to protect by Letters Patent:

1. In a closure-and-tapping mechanism for barrels or the like, a bung constructed and arranged for detachable connection within the bung-opening of the barrel, said bung including a bung-body having a socket formed in its upper edge and having a downwardly-protruding chamber communicating with said socket, upper and lower annular inwardly-protruding valve-seats disposed within said chamber, an air-inlet opening extending through said bung-body and providing communication between the upper end of the barrel and that portion of said chamber intermediate the two valve-seats, a liquid-outlet passageway communicating with that portion of the chamber below the lower valve-seat, an O-ring disposed within said chamber intermediate said valve-seats, a valve-member screw-threadedly mounted within said chamber and having an annular outwardly-protruding shoulder constructed and arranged to contact the underside of said O-ring; and a bung-operating connector constructed and arranged for quick-attachable and -detachable fluid-tight connection to said bung, said bung-operating connector including a body portion having an air-passageway formed therein and having an annular flange provided with a peripheral sealing gasket constructed and arranged to provide a fluid-tight seal with said bung, said bung-operating connector also including an operating-member screw-threadedly adjustable relative to said body portion, said operating-member being provided with an elongated stem having an axial passageway formed therein and having connecting means at its lowermost end for detachable engagement with said valve-member, whereby operation of said operating-member will cause opening or closing movement of said valve-member, the screw-threads of said operating member and said valve-member being of different pitch whereby operation of said operating-member will result in relative movement of said valve-member and said body portion so as to clamp said body portion firmly against said bung simultaneously with the opening movement of said valve-member, said stem having an annular outwardly-protruding shoulder formed somewhat above its lower end and constructed and arranged to contact the upper edge of said O-ring, downward movement of said stem causing said O-ring to be moved downward from the upper valve-seat and to be compressed against the lower valve-seat by the stem shoulder thereby establishing communication between the air-inlet opening of said bung and the air-passageway of said housing and simultaneously establishing communication between the liquid-outlet passageway and the axial stem passageway.

2. In a closure-and-tapping mechanism constructed and arranged to dispense liquid from the top of a barrel or the like, a bung constructed and arranged for detachable connection within the bung-opening of the barrel, said bung including a bung-body having a socket formed in its upper edge and having a downwardly-protruding chamber communicating with said socket, upper and lower annular valve-seats disposed within said bung-body, an air-inlet opening extending through said bung-body and providing communication between the upper end of the barrel and that portion of the chamber intermediate the two valve-seats, a liquid-outlet passageway communicating with that portion of the chamber below the lower valve-seat, compressible sealing-means disposed within said bung-body in operative juxtaposition to each of said valve-seats, a valve-member screw-threadedly mounted within said bung-body and vertically movable relative thereto, movement of said valve-member in one direction tending to compress said sealing-means and thereby to close off both the air-inlet opening and the liquid-outlet passageway; and a bung-operating connector constructed and arranged for quick-attachable and detachable fluid-tight connection to said bung, said bung-operating connector including a body-portion having an air-passageway formed therein and having an annular flange provided with a peripheral sealing-gasket constructed and arranged to provide a fluid-tight seal with the top of said bung, said bung-operating connector also including an operating-member vertically movable relative to said body-portion, said operating-member being provided with an elongated stem having an axial passageway formed therein and having connecting means at its lowermost end for detachable engagement with said valve-member, whereby rotation of said operating-member will cause rotary and axial movement of the interconnected operating member and valve-member in the same direction, movement of the operating-member in one direction causing the valve-member to move in valve-opening direction and, at the same time, causing the body-portion to be pulled downward into fluid-tight sealing relationship with the bung, movement of the operating-member in the other direction causing the valve-member to move in valve-closing direction and, at the same time, forcing the body-portion upward and away from the bung.

3. A construction according to claim 2 wherein the valve-member and the bung-operating connector are both screw-threadedly mounted and wherein the valve-member is provided with an annular upwardly-directed shoulder constructed and arranged to compress the sealing-member against one of said valve-seats when said valve-member is moved upwardly, thereby to close off both the liquid-outlet passageway and the air-inlet opening and wherein the stem has an annular downwardly-directed shoulder constructed and arranged to compress the sealing-member against the other valve-seat upon downward movement of said operating-member and valve-member, thereby opening both the liquid-outlet passageway and the air-inlet opening.

4. A construction according to claim 2 wherein the operating-member is also screw-threadedly mounted and wherein the screw-threads of the operating-member and of the valve-member run in the same direction but are of different pitch whereby operation of the operating-member will result in downward movement of the body-portion into fluid-tight sealing relationship with the bung during valve-opening movement of the valve-member.

5. A construction according to claim 2 wherein downward screw-threaded movement of the valve-member results in opening of the air-inlet opening and the liquid-outlet passageway and wherein the operating-member is also screw-threadedly mounted with its threads running in the same direction but having a smaller pitch than the threads of the valve-member whereby downward movement of the valve-member and operating-member will cause the body-portion to be moved downward into fluid-tight sealing relationship with the bung.

6. A construction according to claim 2 wherein upward screw-threaded movement of the valve-member results in opening of the air-inlet opening and the liquid-outlet passageway and wherein the operating member is also screw-threadedly mounted with its threads running in the same direction but having a larger pitch than the threads of the valve-member whereby upward movement of the valve-member and operating-member will cause the body-portion to be moved downward into fluid-tight sealing relationship with the bung.

7. A construction according to claim 2 wherein the operating-member is also screw-threadedly mounted and wherein the screw-threads of the operating-member and of the valve-member run in the same direction but are of different pitch whereby operation of the operating-member will result in downward movement of the body-portion into fluid-tight sealing relationship with the bung during valve-opening movement of the valve-member and wherein the connection between the operating-member and the valve-member is a bayonet-joint.

8. A construction according to claim 2 wherein the operating-member is also screw-threadedly mounted and wherein the screw-threads of the operating-member and of the valve-member run in the same direction but are of different pitch whereby operation of the operating-member will result in downward movement of the body-portion into fluid-tight sealing relationship with the bung during valve-opening movement of the valve-member and wherein the connection between the operating-member and the valve-member is a screw-threaded connection with the threads running in the same direction as the threads on the operating-member but having an appreciably smaller pitch.

9. In a closure-and-tapping mechanism constructed and arranged to dispense liquid from the top of a barrel or the like; a bung including a hollow bung-body constructed and arranged to be connected within the bung-opening of the barrel and having upper and lower annular valve-seats disposed therewithin, and also having an air-inlet opening extending therethrough and providing communication between the upper end of the barrel and the portion of the bung-body intermediate the valve-seats, and also having a liquid-outlet passageway formed at its lower end, compressible sealing-means disposed within said bung-body, an apertured valve-member having peripheral shoulders and mounted within said bung-body and constructed and arranged to move vertically relative thereto, movement of said valve-member in one direction tending to compress said sealing-means between said bung-body and one of said shoulders and thereby to close off both the air-inlet opening and the liquid-outlet passageway; and a bung-operating connector having connecting means adapted for quick-attachable and -detachable connection to said bung, said bung-operating connector including a hollow body-portion constructed and arranged to be forced into peripheral fluid-tight contact with the top of the bung and having an air-inlet check-valve to permit introduction therewithin of air under pressure, said bung-operating connector also including an operating-member vertically adjustable relative to the body-portion and provided with an elongated stem, said operating-member having an axial conduit formed therein, said stem having connecting means formed at its lower end and constructed and arranged for detachable engagement with said valve-member, vertical movement of the operating-member and stem in one direction causing movement of the valve-member in the same direction thereby to move the valve-member to valve-opening position wherein a continuous air passage is provided from the hollow body-portion peripherally of the valve-member and through the air-inlet opening and wherein a continuous liquid-outlet passage is provided from the liquid-outlet passageway, through the apertured valve and the axial conduit in the operating-member.

10. A construction according to claim 9 wherein the valve-member and the operating-member are both screw-threadedly mounted, with both threads running in the same direction but with the threads of the valve-member having a greater pitch whereby the body-portion of the bung-operating connector is forced downward into fluid-tight contact with the top of the bung simultaneously with the downward axial valve-opening movement of the valve-member.

11. In a closure-and-tapping mechanism constructed and arranged to dispense liquid from the top of a barrel or the like; a bung including a hollow bung-body constructed and arranged to be connected within the bung-opening of the barrel and having opposed upper and lower annular valve-seats disposed therewithin, and also having an air-inlet opening extending therethrough and providing communication between the upper end of the barrel and the portion of the bung-body intermediate the valve-seats, and also having a liquid-outlet passageway formed at its lower end, a compressible sealing-ring or the like disposed within said bung-body intermediate said opposed valve-seats and constructed and arranged to be forced either upwardly against the upper valve-seat or downwardly against the lower valve-seat, an apertured valve-member having peripheral shoulders adapted to engage said sealing ring and mounted within said bung-body and constructed and arranged to be moved vertically relative thereto, and a bung-operating connector having an elongated hollow stem constructed and arranged for quick-attachable and -detachable connection to the apertured valve-member and to effect vertical movement of the valve-member, upward movement of the valve-member causing the sealing-ring to be compressed against the upper valve-seat thereby closing off both the air-inlet opening and the liquid-outlet passageway, downward movement of the valve-member causing the sealing-ring to be compressed against the lower valve-seat thereby to provide a fluid-tight seal separating a continuous air passage extending peripherally and outside of the stem and valve-member and through the air-inlet opening and a continuous liquid-outlet passage extending from the liquid-outlet passageway through the apertured valve and the hollow stem.

12. A construction according to claim 11 wherein the bung-operating connector also includes an enlarged hollow body-portion constructed and arranged to be forced into peripheral fluid-tight contact with the top of the bung, the body-portion being provided with an air-inlet check-valve to permit introduction therewithin of air under pressure.

13. A construction according to claim 11 wherein the bung-operating connector also includes an enlarged hollow body-portion constructed and arranged to be forced into peripheral fluid-tight contact with the top of the bung, the body-portion being provided with an air-inlet check-valve to permit introduction therewithin of air under pressure and wherein the hollow stem is provided with an external operating handle and is screw-threadedly connected to the body-portion whereby it can be moved up-and-down to effect corresponding movement of the valve-member.

14. A construction according to claim 13 wherein the valve-member is also screw-threadedly mounted with its threads running in the same direction as the threads of the stem but having a greater pitch whereby downward valve-opening movement of the valve-member will cause simultaneous downward movement of the body-portion of the bung-operating connector into sealing contact with the top of the bung.

15. In a closure-and-tapping mechanism constructed and arranged to dispense liquids from the top of a barrel having a bung-opening, a hollow bung constructed and arranged to be connected within the bung-opening of said barrel and having opposed upper and lower valve-seats disposed therewithin and having a gas-passageway extending laterally therethrough, one end of said gas-passageway below the wall of the barrel and terminating, at its other end between said two opposed annular valve seats, said hollow bung having a liquid-passageway formed at its lower end, a valve plug slidably mounted within said bung and adapted for movement therewithin in an axial direction between said two valve seats, said valve-plug having a liquid-passageway therethrough, said valve plug separating the gas-passageway from the liquid passageway, and serving, in conjunction with the lower or inner valve seat to control the passage of liquid through the liquid-passageway of the bung and to control, in conjunction with the upper valve seat, the passage of gas through said gas-passageway, and a bung-operator including a gas-delivery housing and a liquid withdrawal and operating stem extending therethrough, said housing adapted to form a liquid-tight seal against said plug and adapted to interconnect therewith to move said plug from its open to its closed position and vice versa.

GEORGE DONALD FLAITH.
JOSEPH E. SMITH, JR.

References Cited in the file of this patent

UNITED STATES PATENTS

| Number | Name | Date |
|---|---|---|
| 548,502 | Barus | Oct. 22, 1895 |
| 602,510 | Knapp | Apr. 19, 1898 |
| 614,465 | Habermann | Nov. 22, 1898 |
| 754,618 | Smith et al. | Mar. 15, 1904 |
| 948,647 | Frishholm | Feb. 8, 1910 |
| 1,070,288 | Quick | Aug. 12, 1913 |

FOREIGN PATENTS

| Number | Country | Date |
|---|---|---|
| 103,116 | Germany | May 12, 1899 |
| 10,203 | Great Britain | Apr. 26, 1910 |